(12) United States Patent
Jung et al.

(10) Patent No.: US 10,165,567 B2
(45) Date of Patent: Dec. 25, 2018

(54) ADAPTIVE COMMUNICATION METHOD AND APPARATUS

(71) Applicant: Samsung Electronics Co., Ltd., Gyeonggi-do (KR)

(72) Inventors: Euichang Jung, Seoul (KR); Suha Yoon, Seoul (KR); Sungrok Yoon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 111 days.

(21) Appl. No.: 15/288,336

(22) Filed: Oct. 7, 2016

(65) Prior Publication Data

US 2017/0105216 A1 Apr. 13, 2017

(30) Foreign Application Priority Data

Oct. 7, 2015 (KR) ........................ 10-2015-0140954

(51) Int. Cl.
*H04W 4/00* (2018.01)
*H04W 72/04* (2009.01)
*H04W 40/02* (2009.01)
*H04W 72/02* (2009.01)
*H04W 88/08* (2009.01)

(52) U.S. Cl.
CPC ....... *H04W 72/0453* (2013.01); *H04W 40/02* (2013.01); *H04W 72/02* (2013.01); *H04W 88/08* (2013.01)

(58) Field of Classification Search
CPC ........ H04W 4/92; H04W 12/06; H04W 52/08
USPC ..... 370/252–339; 455/411.1–414.2; 375/240
See application file for complete search history.

(56) References Cited

U.S. PATENT DOCUMENTS

| | | | |
|---|---|---|---|
| 8,320,877 B2 | 11/2012 | Hansen et al. | |
| 8,503,377 B2 | 8/2013 | Cordeiro et al. | |
| 9,658,738 B1 * | 5/2017 | Park | ................... G06F 3/04817 |
| 2017/0013562 A1 * | 1/2017 | Lim | ..................... H04M 1/725 |

OTHER PUBLICATIONS

IEEE 802 11n, Part 11: Wireless LAN Medium Access Control (MAC) and Physical Layer (PHY) Specifications Amendment 5: Enhancements for Higher Throughput IEEE Standard for Information technology—Telecommunications and Information exchange between systems—Local and metropolitan area networks—Specific requirements IEEE Computer Society Approved Sep. 11, 2009 IEEE—SA Standards Board.

(Continued)

*Primary Examiner* — Iqbal Zaidi
(74) *Attorney, Agent, or Firm* — The Farrell Law Firm, P.C.

(57) ABSTRACT

A method of an electronic device and an electronic device using the same is provided. The electronic device includes a communication module and a processor. The processor confirms context information of the electronic device, selects at least one frequency band or at least one communication path, which are supported by the electronic device, based on the context information, and communicates data between the electronic device and an external electronic device, based on the at least one frequency band or the at least one communication path, using the communication module.

18 Claims, 17 Drawing Sheets

(56) References Cited

OTHER PUBLICATIONS

IEEE 802.11ac, Prepared by the 802.11 Working Group of the 802 Committee Part 11: Wireless LAN Medium Access Control (MAC) and Physical Layer (PHY) specifications Amendment 4: Enhancements for Very High Throughput for Operation in Bands below 6 GHz Draft Standard for Information Technology—Telecommunications and Information exchange between systems—Local and metropolitan area networks—Specific requirements, Jan. 2013.
IEEE Computer Society, Part 11: Wireless LAN Medium Access Control (MAC) and Physical Layer (PHY) Specifications Amendment 3: Enhancements for Very High Throughput in the 60 GHz Band, IEEE Standard for Information technology—Telecommunications and Information exchange between systems Local and metropolitan area networks—Specific requirements, Dec. 28, 2012.
IEEE Computer Society, Part 11: Wireless LAN Medium Access Control (MAC) and Physical Layer (PHY) Specifications IEEE Standard for Information technology—Telecommunications and Information exchange between systems Local and metropolitan area networks—Specific requirements, Mar. 29, 2012.
Cloud Computing, http://pubs.sciepub.com/ajis/2/1/1/figs.
LTE Layer, http://www.google.com/search?q=cloud+client&rlz=1C1CHRG_koKr638KR638&espv=2&biw=1673&bih=905&site=webhp&source=inms&ibm=isch&sa=X&ved=0CAYQ_AUoAWoVchMI8dmd24n9xwIV.

\* cited by examiner

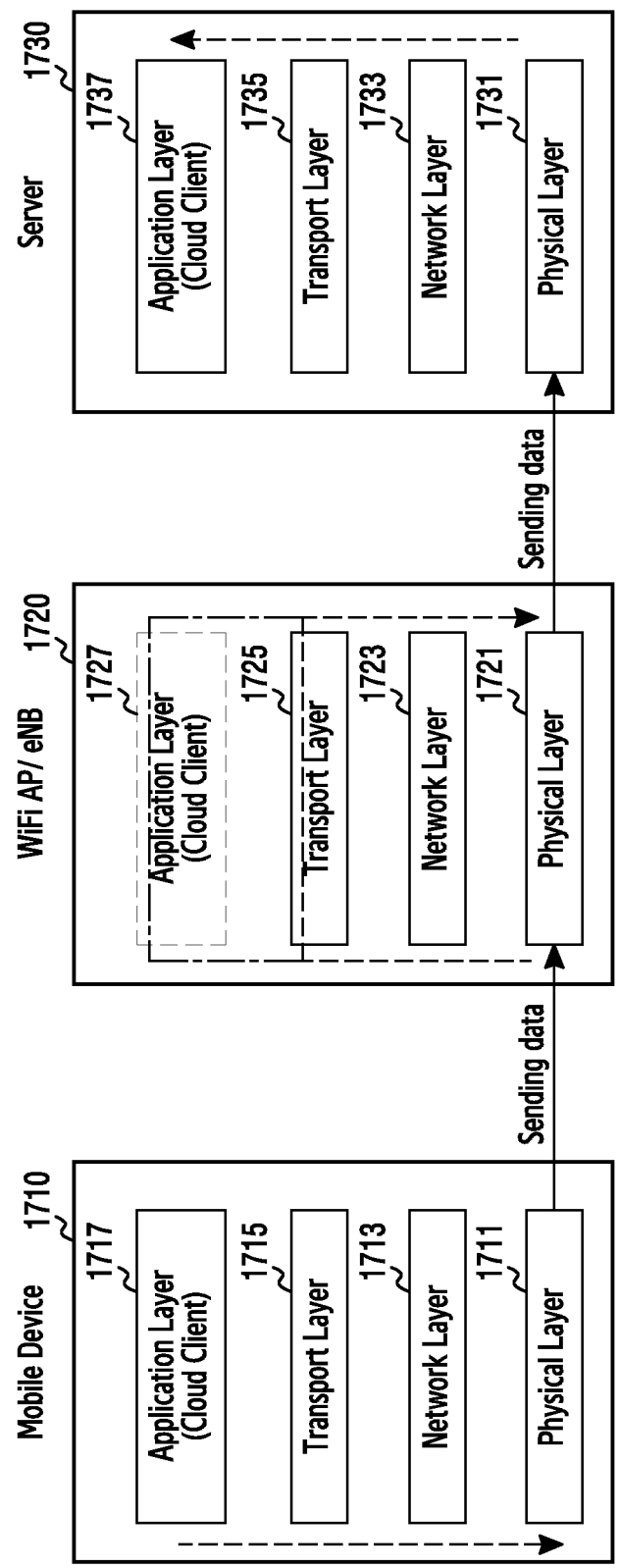

ADAPTIVE COMMUNICATION METHOD AND APPARATUS

PRIORITY

The present application claims priority under 35 U.S.C. § 119(a) to a Korean Patent Application filed in the Korean Intellectual Property Office on Oct. 7, 2015, and assigned Serial No. 10-2015-0140954, the entire disclosure of which is incorporated herein by reference.

BACKGROUND

1. Field of the Disclosure

The present disclosure relates generally to an adaptive communication method and apparatus.

2. Description of the Related Art

To satisfy the needs of users and to enhance portability and convenience, wireless communication devices have become smaller and have seen performance improvements. Users rely on the wireless communication devices such as mobile phones, Personal Digital Assistants (PDAs), and laptop computers, and expect service extension, coverage expansion, and functionality enhancement. A wireless communication system can provide communication to numerous cells, and each cell can be serviced by a base station.

Besides the cellular base station, various wireless communications are under consideration. Wireless communication systems support communication with multiple users by sharing available system resources (e.g., a bandwidth or a power transmission). Recently, research has been conducted to raise communication speed and throughput using a licensed band and an unlicensed band based on a band (or a bandwidth). For example, the Institute of Electrical and Electronics Engineers (IEEE) 802.11 Working Group is developing a standard for wireless local area network (WLAN) computer communication in 2.4 GHz, 5 GHz, and 60 GHz public spectrum bands.

The IEEE 802.11 group is standardizing a new and faster version 802.11 under the name of Very High Throughput (VHT). The IEEE 802.11 group is also considering techniques which refer to a plurality of parallel transmissions without causing collisions, such as space division multiple access (SDMA) and orthogonal frequency division multiple access (OFDMA), and IEEE 802.11 operations in 60 GHz band close to the current 2.4 GHz and 5 GHz.

Devices or Wi-Fi access points (APs) using the 2.4 GHz or 5 GHz band are embodied, and various providers are developing various chipsets in the licensed band or the unlicensed band.

Various bandwidths and their foundation technologies are discussed and researched as communication means for 4th generation (4G), 5th generation (5G), or future generation in cellular bands.

When an electronic device transmits, for example, massive contents (e.g., ultra high definition (UHD) video, 4K/8K video, 3 dimensional (3D) content, holograms, etc.) to a server, the time taken to transmit the contents can increase due to a bandwidth or a transmission rate. The increased required time may cause a charge to be incurred and the content transmission can be unfinished due to battery consumption

SUMMARY

The present disclosure has been made to address at least the above-discussed problems and/or disadvantages and to provide the advantages described below.

Accordingly, an aspect of the present disclosure is to provide enhanced data communication by supporting the selection of a frequency band or a communication path between an electronic device and external devices based on various context information (e.g., a data volume, a transmission rate, etc.).

According to an aspect of the present disclosure, a method of an electronic device is provided. The method includes confirming context information of the electronic device, selecting, at least one frequency band or at least one communication path supported by the electronic device, based on the context information, and communicating data between the electronic device and an external electronic device, based on the at least one frequency band or the at least one communication path.

According to another aspect of the present disclosure, an electronic device is provided. The electronic device includes a communication circuit and a processor. The processor confirms context information of the electronic device, selects at least one frequency band or at least one communication path, which are supported by the electronic device, based on the context information, and communicates data between the electronic device and an external electronic device, based on the at least one frequency band or the at least one communication path, using the communication circuit.

According to another aspect of the present disclosure, an electronic device is provided. The electronic device is for confirming context information in relation to an access point connected to the electronic device or another electronic device, selecting at least one frequency band or at least one of communication path, which are supported by the other electronic device, based on the context information, and transmitting information of the at least one frequency band or the at least one communication path to the access point or the other electronic device.

According to another aspect of the present disclosure, a method of an electronic device is provided. The method includes confirming context information in relation to an access point connected to the electronic device or another electronic device, selecting at least one frequency band or at least one communication path, which are supported by the other electronic device, based on the context information, and transmitting information of the at least one frequency band or the at least one communication path to the access point or the other electronic device.

BRIEF DESCRIPTION OF THE DRAWINGS

The above and other aspects, features, and advantages of the present disclosure will be more apparent from the following description taken in conjunction with the accompanying drawings, in which:

FIGS. 17A to 17C are diagrams of a determination module, according to an embodiment of the present disclosure.

DETAILED DESCRIPTION OF THE EMBODIMENTS OF THE PRESENT DISCLOSURE

Figure 1:
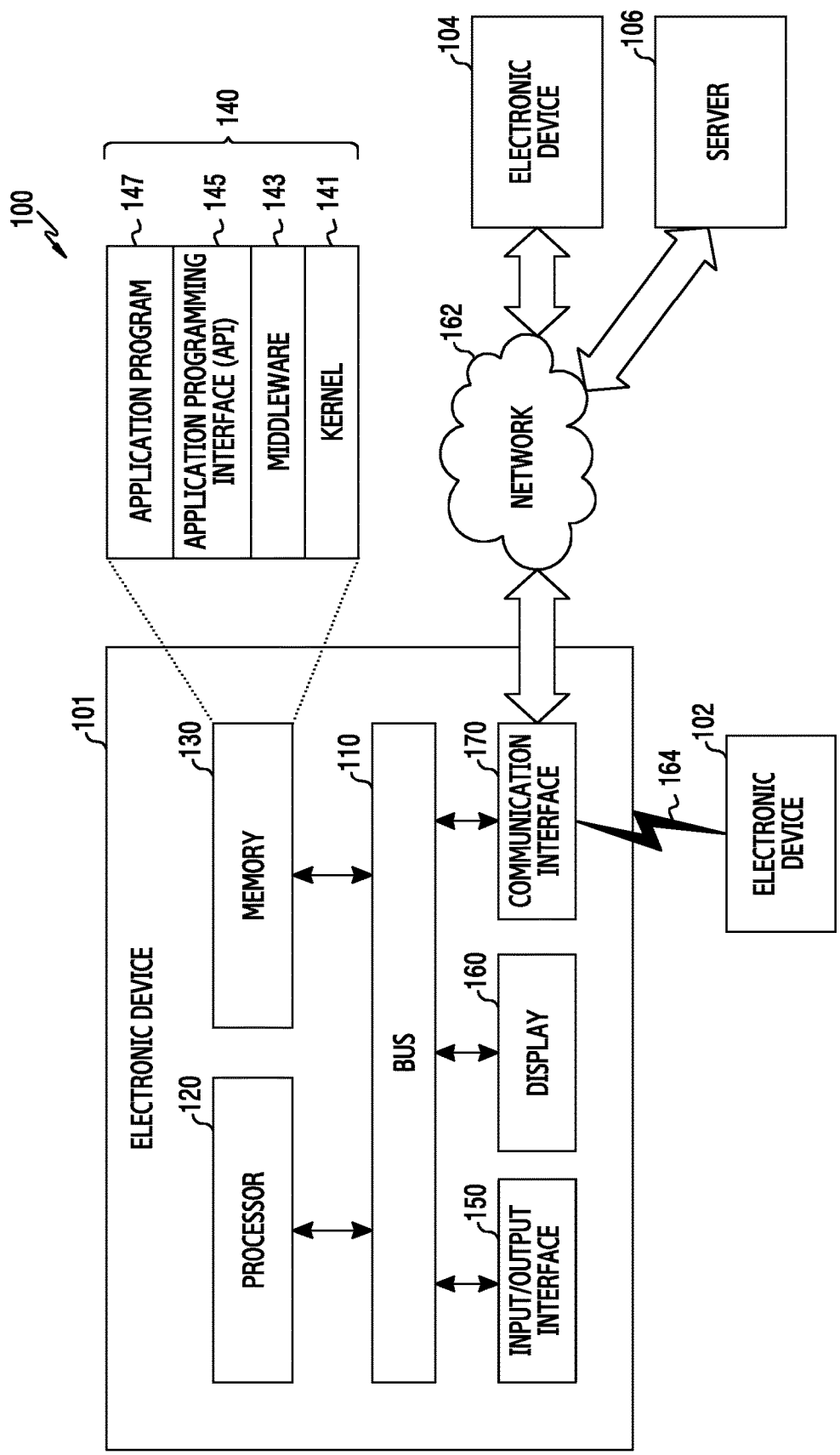
FIG. 1 is a block diagram of a network environment including an electronic device, according to an embodiment of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expressions "have", "include", or "comprise" refer to the existence of a corresponding feature (e.g., numeral, function, operation, or constituent element such as component), and do not exclude one or more additional features.

As used herein, the expressions "A or B", "at least one of A or/and B", or "one or more of A or/and B" may include all possible combinations of the items listed. For example, the expression "A or B", "at least one of A and B", or "at least one of A or B" refers to all of (1) including A, (2) including B, or (3) including both A and B.

As used herein, expressions such as "first", "second", etc. may modify various components regardless of order and/or importance, but do not limit the corresponding components.

For example, a first user device and a second user device indicate different user devices although both of them are user devices. For example, a first element may be referred to as a second element, and similarly, a second element may be referred to as a first element without departing from the scope of the present disclosure.

It should be understood that when an element (e.g., a first element) is referred to as being "connected," or "coupled," to another element (e.g., a second element), the element may be either directly connected or coupled to the other element or any other element (e.g., a third element) may be interposed between the first and second elements. In contrast, it may be understood that when an element (e.g., a first element) is referred to as being "directly connected," or "directly coupled" to another element (e.g., a second element), there are no elements (e.g., third element) interposed between them.

The expression "configured to" used in the present disclosure may be used interchangeably with, for example, the expressions "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., an embedded processor) only for performing the corresponding operations or a generic-purpose processor (e.g., a central processing unit (CPU) or an application processor (AP)) that can perform the corresponding operations by executing one or more software programs stored in a memory device.

The terms used herein are used merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings consistent with the contextual meanings in the relevant field of art, and are not to be interpreted to have ideal or excessively formal meanings, unless clearly defined in the present disclosure. In some cases, even the term defined in the present disclosure should not be interpreted to exclude embodiments of the present disclosure.

An electronic device, according to various embodiments of the present disclosure, may include at least one of a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad or tattoo), and a bio-implantable type (e.g., an implantable circuit).

According to some embodiments, the electronic device may be a home appliance. The home appliance may include at least one of a television, a digital versatile disk (DVD)

player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), an avionics device, a security device, an automotive head unit, a robot for home or industry, an automatic teller machine (ATM), a point of sale (POS) device, or an Internet of Things (IoT) device (e.g., a light bulb, various sensors, an electric or gas meter, a sprinkler device, a fire alarm, a thermostat, a streetlamp, a toaster, sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter).

The electronic device, according to various embodiments of the present disclosure, may be a combination of one or more of the aforementioned various devices.

The electronic device, according to some embodiments of the present disclosure, may be a flexible device.

Further, the electronic device, according to an embodiment of the present disclosure, is not limited to the aforementioned devices, and may include a new electronic device based on the development of technology.

Hereinafter, an electronic device, according to various embodiments, will be described with reference to the accompanying drawings. As used herein, the term "user" may indicate a person who uses an electronic device or a device (e.g., an artificial intelligence electronic device) that uses an electronic device.

FIG. 1 is a block diagram of a network environment including an electronic device, according to an embodiment of the present disclosure.

Referring to FIG. 1, a network environment 100 including an electronic device 101 is provided. The electronic device 101 may include a bus 110, a processor 120, a memory 130, an input/output interface 150, a display 160, and a communication interface 170. In some embodiments, the electronic device 101 may omit at least one of the above elements or may further include other elements.

The bus 110 is a circuit for connecting the elements 110-170 and transferring communication (e.g., control messages and/or data) between the elements.

The processor 120 may include one or more of a CPU, an AP, and a communication processor (CP). The processor 120 may carry out operations or data processing relating to control and/or communication of at least one other element of the electronic device 101.

The memory 130 may include a volatile memory and/or a non-volatile memory. The memory 130 may store instructions or data relevant to at least one other element of the electronic device 101. The memory 130 may store software and/or a program 140. The program 140 may include a kernel 141, middleware 143, an application programming interface (API) 145, and/or application programs 147. At least some of the kernel 141, the middleware 143, and the API 145 may be referred to as an operating system (OS).

The kernel 141 may control or manage system resources (e.g., the bus 110, the processor 120, or the memory 130) used for performing an operation or function implemented by the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143 may function as an intermediary for allowing the API 145 or the application programs 147 to communicate with the kernel 141 to exchange data.

In addition, the middleware 143 may process one or more operation requests received from the application programs 147 according to a priority. For example, the middleware 143 may give priority to use the system resources of the electronic device 101 (for example, the bus 110, the processor 120, the memory 130, and the like) to at least one of the application programs 147. For example, the middleware 143 may perform scheduling or load balancing with respect to the one or more operation requests by processing the one or more operation requests according to the priority given to the at least one of the application programs 147.

The API 145 is an interface through which the application programs 147 control functions provided from the kernel 141 or the middleware 143, and may include at least one interface or function (e.g., instruction) for file control, window control, image processing, or text control.

The input/output interface 150 may function as an interface that may transfer instructions or data input from a user or another external device to the other element(s) of the electronic device 101. Furthermore, the input/output interface 150 may output the instructions or data received from the other elements of the electronic device 101 to the user or another external device (e.g., a first external electronic device 102, a second external electronic device 104, or a server 106).

The display 160 may include a liquid crystal display (LCD), a light emitting diode (LED) display, an organic light emitting diode (OLED) display, a micro electro mechanical system (MEMS) display, or an electronic paper display. The display 160 may display various types of content (e.g., text, images, videos, icons, or symbols) to the user. The display 160 may include a touch screen and receive a touch, gesture, proximity, or hovering input using an electronic pen or the user's body part.

The communication interface 170 may set communication between the electronic device 101 and the first external electronic device 102, the second external electronic device 104, or the server 106. For example, the communication interface 170 may be connected to a network 162 through wireless or wired communication to communicate with the second external electronic device 104 or the server 106.

The wireless communication may use at least one of, for example, long term evolution (LTE), LTE-advance (LTE-A), code division multiple access (CDMA), wideband CDMA (WCDMA), universal mobile telecommunications system (UMTS), WiBro (Wireless Broadband), and global system for mobile communications (GSM), as a cellular communication protocol. In addition, the wireless communication may include short range communication 164. The short-range communication 164 may be performed by using at least one of Wi-Fi, bluetooth (BT), bluetooth low energy (BLE), near field communication (NFC), and global navigation satellite system (GNSS). The GNSS may include at least one of a GPS, a global navigation satellite system (Glonass), a Beidou navigation satellite system (Beidou), and a European global satellite-based navigation system (Galileo), according to a use area, a bandwidth, or the like. Hereinafter, in the present disclosure, "GPS" may be interchangeably used with "GNSS".

The wired communication may include at least one of, for example, a universal serial bus (USB), a high definition multimedia interface (HDMI), recommended standard 232 (RS-232), and a plain old telephone service (POTS).

The network 162 may include at least one of a communication network such as a computer network (e.g., a LAN or a WAN), the Internet, and a telephone network.

Each of the first and second external electronic devices 102 and 104 may be of a type identical to or different from that of the electronic device 101.

According to an embodiment, the server 106 may include a group of one or more servers.

According to various embodiments, all or some of the operations performed in the electronic device 101 may be performed in one or more external electronic devices (e.g., the external electronic devices 102 and 104 or the server 106). When the electronic device 101 has to perform some functions or services automatically or in response to a request, the electronic device 101 may make a request for performing at least some functions relating thereto to another device (e.g., the external electronic device 102 or 104 or the server 106) instead of performing the functions or services by itself or in addition. In this case, the other electronic device may execute the requested functions or the additional functions, and deliver a result of the execution to the electronic device 101. The electronic device 101 may process the received result as it is or additionally to provide the requested functions or services. To achieve this cloud computing, distributed computing, or client-server computing technology may be used.

Figure 2:
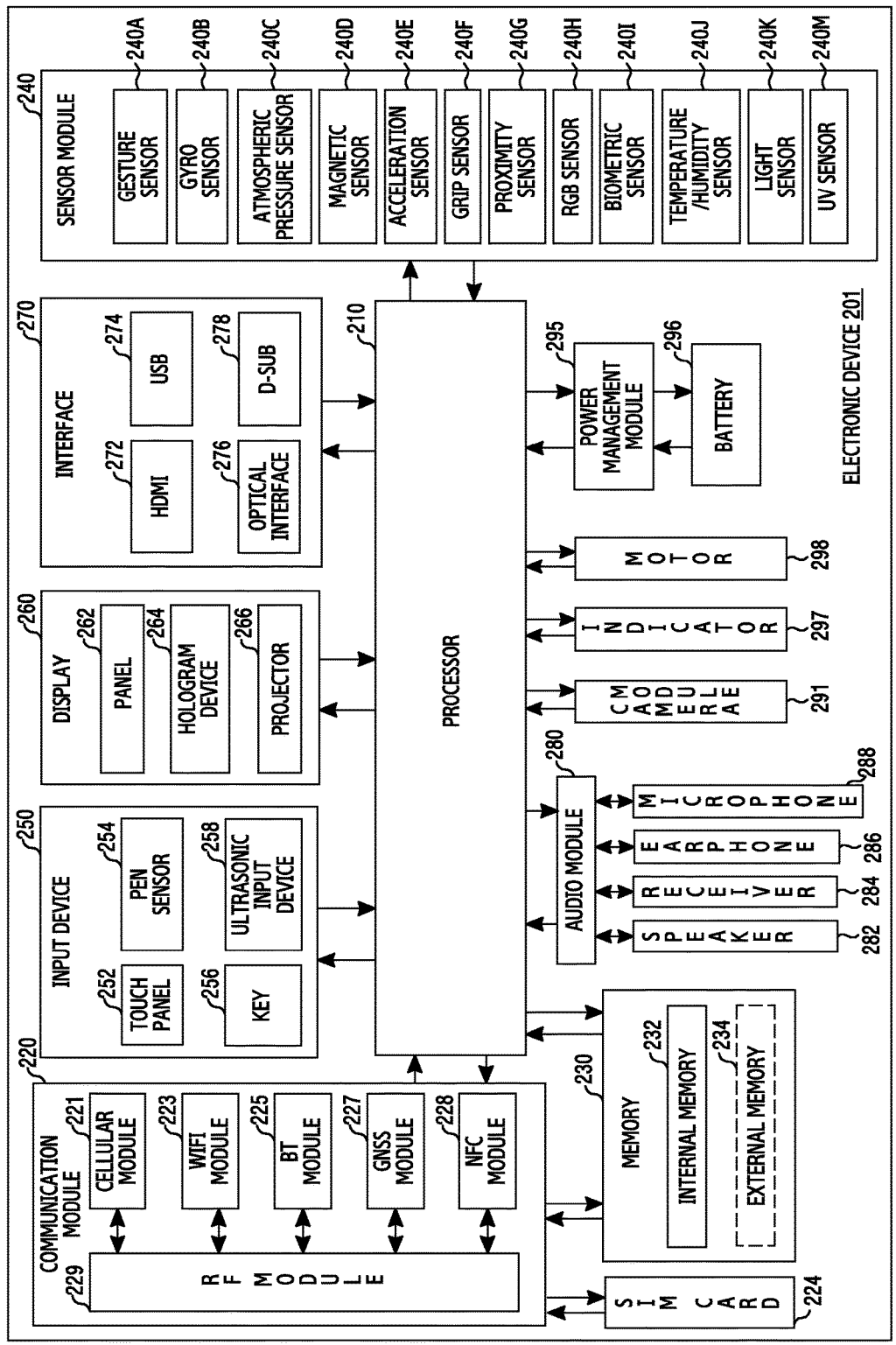
FIG. 2 is a block diagram of a configuration of an electronic device, according to an embodiment of the present disclosure.

FIG. 2 is a block diagram of a configuration of an electronic device, according to an embodiment of the present disclosure.

Referring to FIG. 2, an electronic device 201 is provided. The electronic device 201 may include the whole or part of the electronic device 101 illustrated in FIG. 1. The electronic device 201 may include at least one processor 210 (e.g., AP), a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program and perform processing of various pieces of data and calculations. The processor 210 may be implemented by, for example, a System on Chip (SoC). According to an embodiment, the processor 210 may further include a Graphic Processing Unit (GPU) and/or an image signal processor. The processor 210 may include at least some (e.g., a cellular module 221) of the elements of the electronic device 201. The processor 210 may load, into a volatile memory, instructions or data received from at least one (e.g., a non-volatile memory) of the other elements and may process the loaded instructions or data, and may store various data in a non-volatile memory.

The communication module 220 may have a configuration equal or similar to that of the communication interface 170 of FIG. 1. The communication module 220 may include the cellular module 221, a Wi-Fi module 223, a BT module 225, a GNSS module 227 (e.g., a GPS module, a Glonass module, a Beidou module, or a Galileo module), an NFC module 228, and a Radio Frequency (RF) module 229.

The cellular module 221 may provide a voice call, image call, a text message service, or an Internet service through a communication network. The cellular module 221 may distinguish between and authenticate electronic devices 201 within a communication network using the SIM card 224. According to an embodiment of the present disclosure, the cellular module 221 may perform at least some of the functions that the processor 210 may provide. The cellular module 221 may include a Communication Processor (CP).

Each of the Wi-Fi module 223, the BT module 225, the GNSS module 227, and the NFC module 228 may include a processor for processing data transmitted and received through the relevant module. According to some embodiments of the present disclosure, at least some of the cellular module 221, the Wi-Fi module 223, the BT module 225, the GNSS module 227, and the NFC module 228 may be included in one integrated chip (IC) or IC package.

The RF module 229 may transmit/receive a communication signal (for example, an RF signal). The RF module 229 may include a transceiver, a power amplifier module (PAM), a frequency filter, a low noise amplifier (LNA), and an antenna. According to another embodiment of the present disclosure, at least one of the cellular module 221, the Wi-Fi module 223, the BT module 225, the GNSS module 227, and the NFC module 228 may transmit and receive RF signals through a separate RF module.

The SIM card 224 may include a card including a subscriber identity module and/or an embedded SIM, and may contain unique identification information (e.g., an integrated circuit card identifier (ICCID)) or subscriber information (e.g., an international mobile subscriber identity (IMSI)).

The memory 230 may include an internal memory 232 or an external memory 234.

The internal memory 232 may include at least one of a volatile memory (for example, a dynamic random access memory (DRAM), a static RAM (SRAM), a synchronous dynamic RAM (SDRAM), and the like) and a non-volatile memory (for example, a one-time programmable read only memory (OTPROM), a programmable ROM (PROM), an erasable and programmable ROM (EPROM), an electrically erasable and programmable ROM (EEPROM), a mask ROM, a flash ROM, a flash memory (for example, a NAND flash memory or a NOR flash memory), a hard disc drive, a solid state drive (SSD), and the like).

The external memory 234 may include a flash drive a compact flash (CF), a secure digital (SD), a micro secure digital (micro-SD), a mini secure digital (mini-SD), an extreme digital (xD), a memory stick, or the like. The external memory 234 may be functionally and/or physically connected to the electronic device 201 through various interfaces.

The sensor module 240 may measure a physical quantity or detect an operation state of the electronic device 201, and may convert the measured or detected information into an electrical signal. For example, the sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a red, green, and blue (RGB) sensor 240H, a bio-sensor 240I, a temperature/humidity sensor 240J, a light sensor 240K, and an ultra violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments of the present disclosure, the electronic apparatus 201 may further include a processor configured to control the sensor module 240 as a part of or separately from the processor 210, and may control the sensor module 240 while the processor 210 is in a sleep state.

The input device 250 may include a touch panel 252, a digital pen sensor 254, a key 256, or an ultrasonic input device 258.

The touch panel 252 may use at least one of, for example, a capacitive type, a resistive type, an infrared type, and an ultrasonic type. Also, the touch panel 252 may further include a control circuit. The touch panel 252 may further include a tactile layer and provide a tactile reaction to the user.

The digital pen sensor 254 may include a recognition sheet which is a part of the touch panel 252 or is separated from the touch panel 252.

The key 256 may include, for example, a physical button, an optical key or a keypad.

The ultrasonic input device 258 may detect ultrasonic wavers generated by an input tool through a microphone 288 and identify data corresponding to the detected ultrasonic waves.

The display 260 may include a panel 262, a hologram device 264, or a projector 266.

The panel 262 may include a configuration that is identical or similar to the display 160 illustrated in FIG. 1. The panel 262 may be implemented to be flexible, transparent, or wearable. The panel 262 and the touch panel 252 may be implemented as one module.

The hologram 264 may show a three dimensional image in the air by using an interference of light.

The projector 266 may display an image by projecting light onto a screen. The screen may be located inside or outside the electronic device 201.

According to an embodiment, the display 260 may further include a control circuit for controlling the panel 262, the hologram device 264, or the projector 266.

The interface 270 may include a HDMI 272, a USB 274, an optical interface 276, or a D-subminiature (D-sub) 278. The interface 270 may be included in the communication interface 170 illustrated in FIG. 1. Additionally or alternatively, the interface 270 may include a mobile high-definition link (MHL) interface, an SD or multimedia card (MMC) interface, or an infrared data association (IrDA) standard interface.

The audio module 280 may bilaterally convert a sound and an electrical signal. At least some elements of the audio module 280 may be included in the input/output interface 145 illustrated in FIG. 1. The audio module 280 may process sound information which is input or output through a speaker 282, a receiver 284, earphones 286, the microphone 288, or the like.

The camera module 291 is a device which may photograph a still image and a dynamic image. According to an embodiment, the camera module 291 may include one or more image sensors (for example, a front sensor or a back sensor), a lens, an image signal processor (ISP) or a flash (for example, LED or xenon lamp).

The power management module 295 may manage power of the electronic device 201. According to an embodiment, the power management module 295 may include a power management integrated circuit (PMIC), a charger integrated circuit (IC), or a battery gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure a residual quantity, a voltage, a current, or a temperature during the charging of the battery 296. The battery 296 may include, for example, a rechargeable battery or a solar battery.

The indicator 297 may display a particular state (e.g., a booting state, a message state, a charging state, or the like) of the electronic device 201 or a part (e.g., the processor 210) of the electronic device 210.

The motor 298 may convert an electrical signal into a mechanical vibration, and may generate a vibration, a haptic effect, or the like.

The electronic device 201 may include a processing unit (e.g., a GPU) for supporting a mobile TV. The processing unit for supporting the mobile TV may process media data according to a certain standard such as digital multimedia broadcasting (DMB), digital video broadcasting (DVB), or mediaFLO™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components, according to various embodiments, may be combined into one entity, which may perform functions identical to those of the relevant components before the combination.

Figure 3:
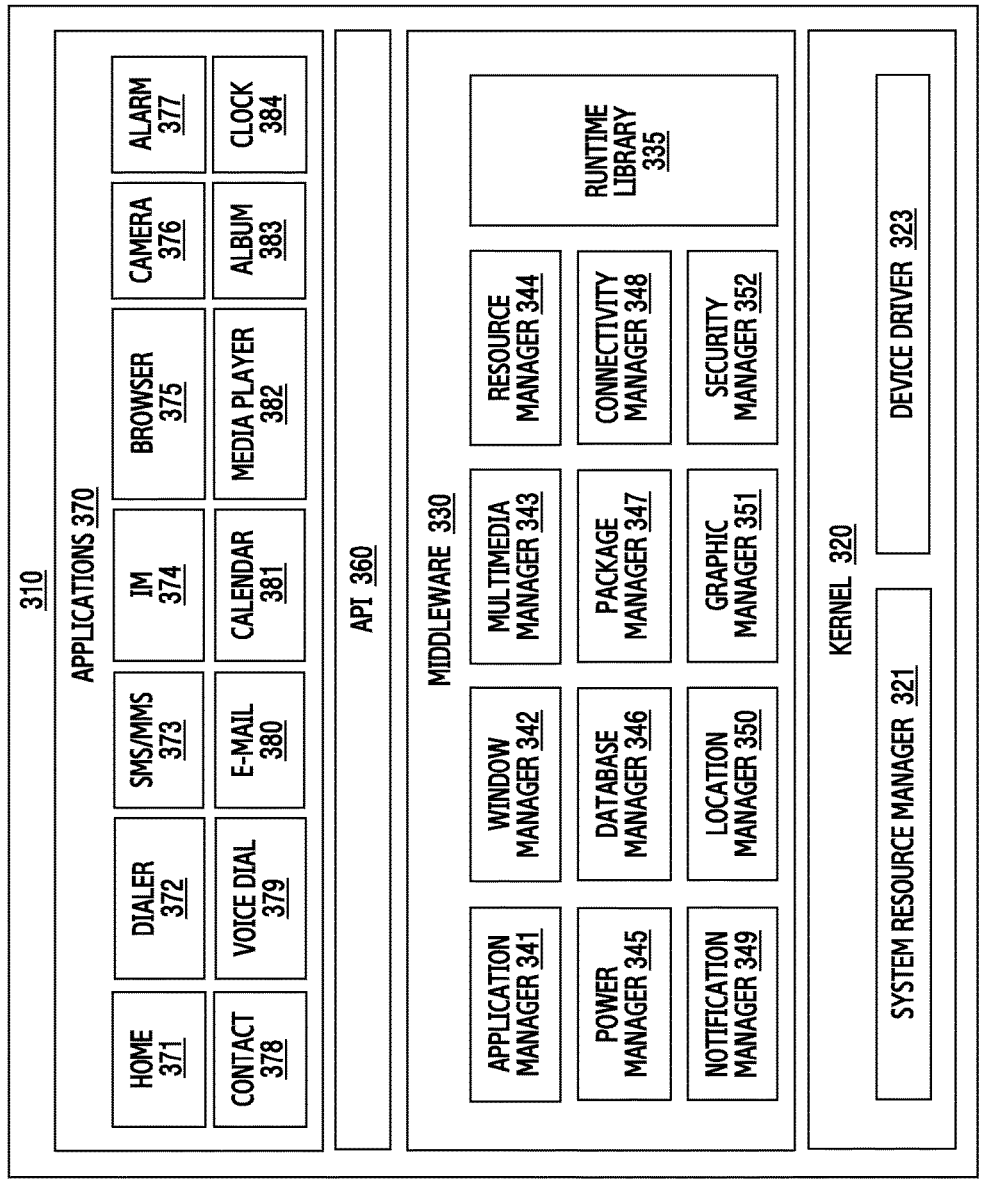
FIG. 3 is a block diagram of a configuration of a program module, according to an embodiment of the present disclosure.

FIG. 3 is a block diagram of a configuration of a program module, according to an embodiment of the present disclosure.

Referring to FIG. 3, a program module 310 is provided. The program module 310 may include an OS for controlling resources related to the 101 and/or various applications 370 executed in the OS. The OS may be, for example, Android™, iOS™, Windows™, Symbian™, Tizen™, Bada™, or the like.

The program module 310 may include a kernel 320, middleware 330, an API 360, and/or an applications 370. At least some of the program module 310 may be preloaded on the electronic device 101, or may be downloaded from an external electronic device (e.g., the external electronic device 102 or 104, or the server 106).

The kernel 320 may include a system resource manager 321 and/or a device driver 323.

The system resource manager 321 may perform the control, allocation, retrieval, or the like of system resources. According to an embodiment of the present disclosure, the system resource manager 321 may include a process manager, a memory manager, a file system manager, or the like.

The device driver 323 may include a display driver, a camera driver, a BT driver, a shared memory driver, a USB driver, a keypad driver, a Wi-Fi driver, an audio driver, or an inter-process communication (IPC) driver.

The middleware 330 may provide a function required by the applications 370 in common or provide various functions to the applications 370 through the API 360 so that the applications 370 can efficiently use limited system resources within the electronic device 101. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, the functionality for an arithmetic function, or the like.

The application manager 341 may manage the life cycle of at least one of the applications 370.

The window manager 342 may manage graphical user interface (GUI) resources used for the screen.

The multimedia manager 343 may determine a format required to reproduce various media files, and may encode or decode a media file by using a coder/decoder (codec) appropriate for the relevant format.

The resource manager 344 may manage resources, such as a source code, a memory, a storage space, and the like of at least one of the applications 370.

The power manager 345 may operate together with a basic input/output system (BIOS) to manage a battery or power and may provide power information required for the operation of the electronic device 101.

The database manager 346 may generate, search for, and/or change a database to be used by at least one of the applications 370.

The package manager 347 may manage the installation or update of an application distributed in the form of a package file.

The connectivity manager 348 may manage a wireless connection such as Wi-Fi or BT.

The notification manager 349 may display or notify a user of an event, such as the arrival of a message, an appointment, a proximity notification, and the like, in such a manner as not to disturb the user.

The location manager 350 may manage location information of the electronic device 101.

The graphic manager 351 may manage a graphic effect, which is to be provided to the user, or a user interface related to the graphic effect.

The security manager 352 may provide various security functions required for system security, user authentication, and the like.

According to an embodiment of the present disclosure, when the electronic device 101 has a telephone call function, the middleware 330 may further include a telephony manager for managing a voice call function or a video call function of the electronic device 101.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 is a set of API programming functions, and may be provided with a different configuration according to an OS. For example, in the case of Android™ or iOS™, one API set may be provided for each platform. In the case of Tizen™, two or more API sets may be provided for each platform.

The applications 370 may include one or more applications which can provide functions such as home 371, dialer 372, SMS/MMS 373, instant message (IM) 374, browser 375, camera 376, alarm 377, contacts 378, voice dial 379, email 380, calendar 381, media player 382, album 383, clock 384. The applications 370 may additionally provide a health care (for example, to measure exercise quantity or blood sugar level) function, or environment information (for example, to measure atmospheric pressure, humidity, or temperature) function.

According to an embodiment of the present disclosure, the applications 370 may include an information exchange application supporting information exchange between the electronic device 101 and an external electronic device (e.g., the external electronic device 102 or 104). The application associated with information exchange may include a notification relay application for forwarding specific information to an external electronic device, or a device management application for managing an external electronic device.

For example, the notification relay application may include a function of delivering, to the external electronic device 102 or 104, notification information generated by other applications (e.g., an SMS/MMS application, an email application, a health care application, an environmental information application, etc.) of the electronic device 101. Further, the notification relay application may receive notification information from an external electronic device and provide the received notification information to a user.

The device management application may manage (for example, install, delete, or update) a function for at least a part of the external electronic device 102 or 104 communicating with the electronic device 101 (for example, turning on/off the external electronic device itself (or some elements thereof) or adjusting the brightness (or resolution) of a display), applications executed in the external electronic device, or services provided from the external electronic device (for example, a telephone call service or a message service).

According to an embodiment, the applications 370 may include applications (for example, a health care application of a mobile medical appliance or the like) designated according to attributes of the external electronic device 102 or 104. The application 370 may include an application received from the server 106 or the external electronic device 102 or 104. The application 370 may include a preloaded application or a third party application which can be downloaded from the server.

Names of the elements of the program module 310, according to the above-described embodiments of the present disclosure, may change depending on the type of OS.

According to an embodiment of the present disclosure, at least some of the program module 310 may be implemented in software, firmware, hardware, or a combination of two or more thereof. At least some of the program module 310 may be implemented (e.g., executed) by the processor 210. At least some of the program module 310 may include a module, a program, a routine, a set of instructions, and/or a process for performing one or more functions.

The term "module", as used herein, may mean a unit including one of hardware, software, and firmware or a combination of two or more of them. The term "module" may be interchangeably used with the term "unit", "logic", "logical block", "component", or "circuit".

The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which have been known or are to be developed in the future.

The module or the program module, according to an embodiment, may include one or more elements described above; exclude some of them; or further include other elements. The operations performed by the module, the program module, or other elements, according to an embodiment, may be executed in a sequential, parallel, iterative, or heuristic method. In addition, some operations may be executed in a different order, or may be omitted, or other operations may be added. In addition, the embodiments disclosed in the present document are intended for the explanation and understanding of the technical matter, and shall not limit the scope of the technology described in the present document. Accordingly, the scope of the present disclosure should be construed to encompass all modifications or various other embodiments based on the technical concept of the present disclosure.

Figure 4:
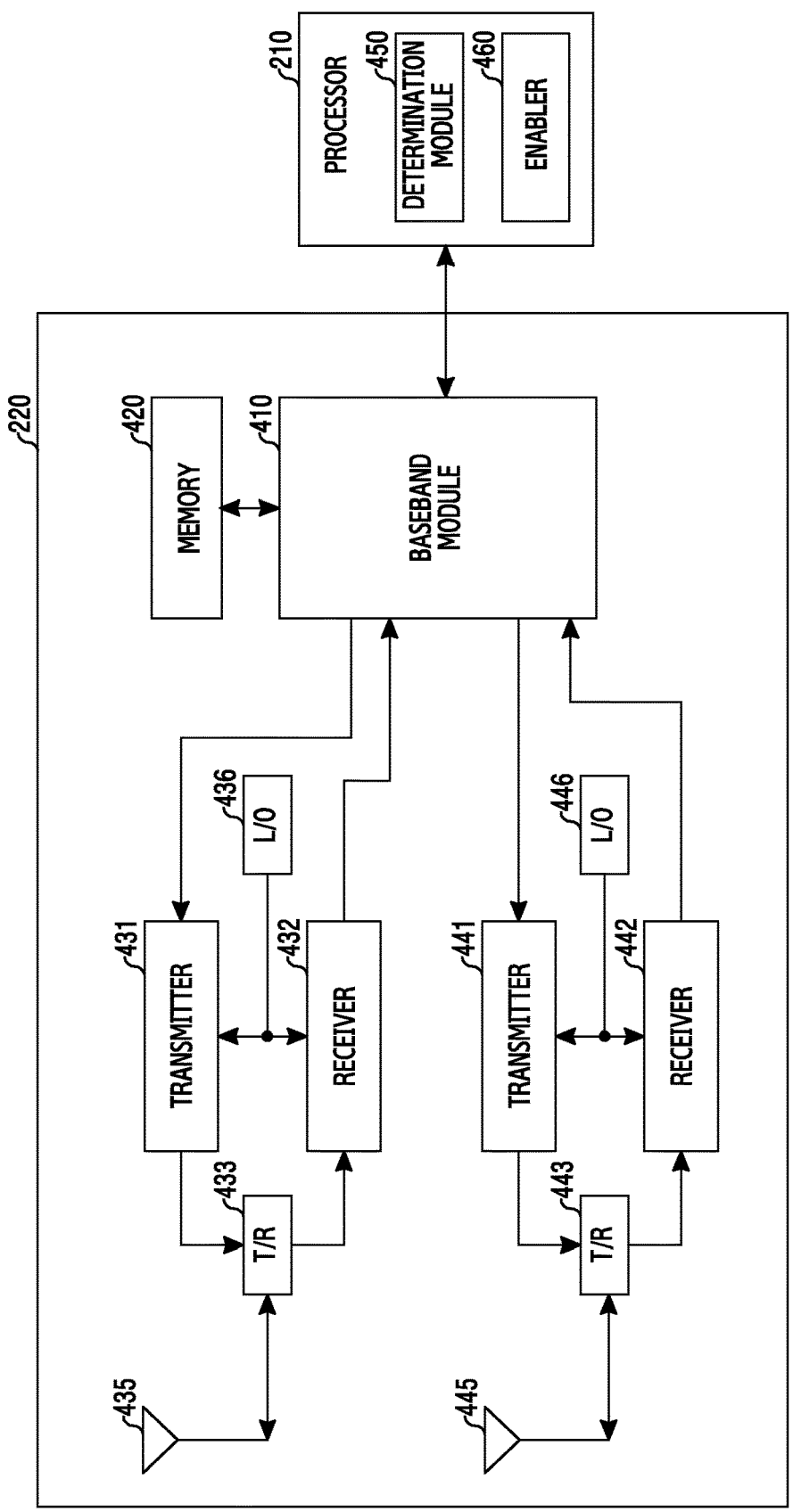
FIG. 4 is a block diagram of a communication module and a processor for an adaptive communication method of an electronic device, according to an embodiment of the present disclosure.

FIG. 4 is a block diagram of a communication module and a processor for an adaptive communication method of an electronic device, according to an embodiment of the present disclosure.

Referring to FIG. 4, the electronic device 201 including the processor 210 and the communications module 220 is provided. The communication module 220 can include a baseband module 410, a memory 420, first and second transmitters 431 and 441, first and second receivers 432 and 442, first and second switching modules 433 and 443, first and second Local Oscillators (LOs) 436 and 446, and first and second antennas 435 and 445.

The baseband module 410 can include a processor for controlling baseband processing. According to another embodiment, the baseband module 410 can be a digital signal processor (DSP) or include a DSP. The baseband module 410 can be functionally connected to an application processor, a host unit, a device for conducting another function, or a user interface. The baseband module 410 can operate using a plurality of communication protocols, and process packetization and transmitted/received signal processing. The baseband module 410 can include two separate baseband processors. For example, the baseband module 410 can include a processor for processing 60 GHz frequency band signals and a processor for processing 2.4 GHz or 5 GHz frequency band signals. For example, the baseband module 410 can include a processor for processing 3 GHz frequency band signals in a 450 MHz frequency band, and a processor for processing mmWave frequency band signals over a 6 GHz frequency band.

The memory 420 can be functionally connected, and store program instructions and data executed in the baseband module 210. While the memory 410 is included in the communication module 220 in FIG. 4, the memory 410 can be separate from the communication module 220.

The first transmitter 431, the first receiver 432, the first switching module 433, the first LO 436, and the first antenna 435 supports communication on a first communication path. The first transmitter 431 and the first receiver 432 can be connected to the first antenna 435 through switching of the first switching module 433. According to another embodiment, when the communication module 220 further includes an antenna, the antenna can be connected to the first transmitter 431 and first the receiver 432, respectively. The first transmitter 431 and the first receiver 432 can perform communication using the 60 GHz frequency band. The communication module 220 can further include additional antennas for providing multiple-input and multiple-output performances such as antenna diversity or multiple-input multiple-output (MIMO).

The second transmitter 441, the second receiver 442, the second switching module 443, the second LO 446, and the second antenna 445 supports communication on a second communication path. The second transmitter 441 and the second receiver 442 can be connected to the second antenna 445 through switching of the second switching module 443. According to another embodiment, when the communication module 220 further includes an antenna, the antenna can be connected to the second transmitter 441 and the second receiver 442, respectively. The second transmitter 441 and the second receiver 442 can perform communication using the 2.4 GHz or 5 GHz frequency band. The communication module 220 can further include additional antennas for providing multiple-input and multiple-output performances such as antenna diversity or MIMO.

The first and second switching modules 433 and 443 can include a duplexer.

The first and second LOs 436 and 446 can send an LO signal for up-converting the frequency to the first and second transmitters 431 and 441, and send an LO signal for down-converting the frequency to the first and second receivers 432 and 442. While two LOs are depicted in FIG. 4, the communication module 220 can include one or three or more LOs.

The processor 210 can be an application processor or a host unit. The processor 210 can select at least one frequency band or at least one communication path based on context information of the electronic device 201. For example, the processor 210 can confirm the context information of the electronic device 201, and select at least one frequency band or at least one communication path when the confirmed context information corresponds to a preset condition. The processor 210 can include a determination module 450 for confirming the context information of the electronic device 201 and determining whether the confirmed context information corresponds to the preset condition. According to another embodiment, the determination module 450 for confirming the context information of the electronic device 201 and determining whether the confirmed context information corresponds to the preset condition can be included in the electronic device 201 separately from the processor 210. The processor 210 can include an enabler 460 for, when the frequency band is selected, activating the communication module 220 to use the selected frequency band. For example, the processor 210 can include the enabler 460 for activating the baseband module 410, the first LO 436, the first switching module 433, the first transmitter 431 or the first receiver 432, and the first antenna 435 to use the 60 GHz frequency band. Besides the electronic device 101, the processor 210 and the communication module 220 of FIG. 4 can be identically or similarly included in an access point (AP), a base station, an electronic device serving as a mobile AP, or a storage device (e.g., a network storage device).

Hereafter, a method for providing adaptive communication by selecting at least one frequency band or at least one communication path at least based on the context information of the electronic device 101 is described.

The electronic device 210 of FIG. 4 can further include or omit at least one component according to the performance of the electronic device 201. Those skilled in the art shall appreciate that positions of the components can vary according to the performance or the structure of the electronic device 201.

The electronic device 201 can include a communication circuit and a processor. The processor can confirm context information of the electronic device, selects at least one of frequency bands or at least one of communication paths supported by the electronic device at least based on the context information, and communicate data between the electronic device and an external electronic device at least based on the at least one frequency band or the at least one communication path using the communication circuit.

The context information can include a status of the electronic device, an attribute of the data, a status of an access point communicatively connected with the electronic device, a user input, or a combination thereof.

The status of the electronic device can include a battery level of the electronic device, a location, a signal level, or a combination thereof.

The context information can include a size of data to transmit from the electronic device to the external electronic device using the at least one frequency band, a transmission rate of the data, a type of the data, or a combination thereof.

The at least one communication path can include an available communication path between the electronic device and the external electronic device.

The at least one communication path can be established by the electronic device in coordination with another external device of the electronic device.

The at least one communication path can include a first communication path and a second communication path, and the processor can perform data communication using an access point functionally connected with the electronic device when the at least one communication path comprises the first path, and perform data communication using a base station functionally connected with the electronic device when the at least one communication path comprises the second path.

The processor can perform data communication using a network storage device functionally connected to the access point or the base station.

When the size of the data is greater than a preset size or a capacity of a memory functionally connected to the electronic device, the processor can store the data in the network storage device.

The processor can change the at least one frequency band of the electronic device to a 2.4 GHz, 5 GHz, or mm Wave frequency band.

An electronic device can confirm context information in relation to an access point connected to the electronic device or another electronic device, select at least one of frequency bands or at least one of communication paths, which are supported by the other electronic device, at least based on the context information, and transmit information of the at least one frequency band or communication path to the access point or the another electronic device.

Data can be communicated with the access point or the other electronic device through at least part of the at least one frequency band or at least part of the at least one communication path.

As used herein, the term "establish" can be used interchangeably with the terms "configure (e.g., set)", "select", or "designate". When a module for establishing the at least one communication path is embodied as a cloud client, the cloud client can, when receiving data through a physical layer (e.g., the communication module), determine a type and a size of the received data using an application layer. According to another embodiment, the cloud client can include a determination module and establish at least one communication path or at least one frequency band using the determination module.

Figure 5:
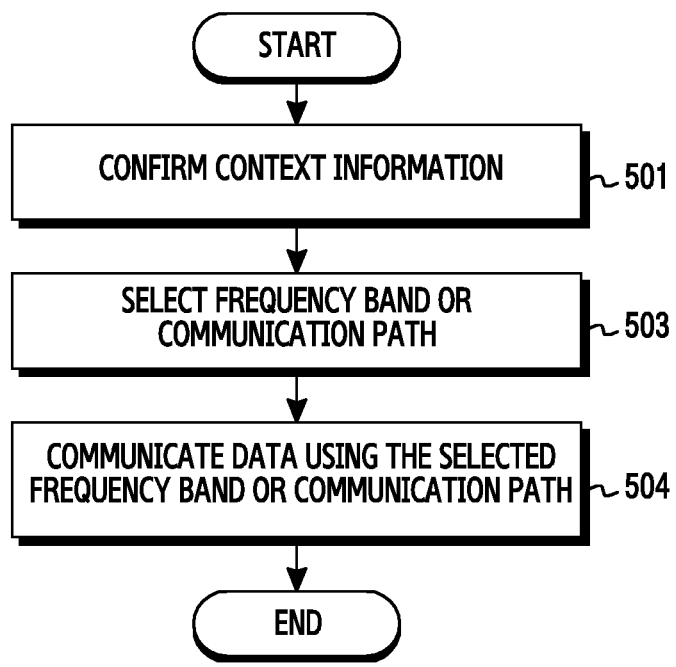
FIG. 5 is a flowchart of an adaptive communication method of an electronic device, according to an embodiment of the present disclosure.

FIG. 5 is a flowchart of an adaptive communication method of an electronic device, according to an embodiment of the present disclosure.

Referring to FIG. 5, in step 501, the electronic device 101 (e.g., the processor 210) can confirm its context information.

The context information can include context information for selecting at least one of frequency bands supported by the electronic device 101. For example, the context information can include, but not limited to, a data size (or a volume or a data transfer amount), a data transmission rate, a data type, setting of the electronic device 101, a type of an application (or an application protocol) executed, a battery status (e.g., a remaining power of a battery) of the electronic device 101, setting of an AP which forwards data from the electronic device 101, an AP status, or their combination.

According to an embodiment, the communication path or the frequency between the electronic device 101 and an external device can be selected based on a priority defined by a user.

The context information can include context information for selecting the communication path between the electronic device 101 and an external device to which data is transmitted. For example, the context information can include, but is not limited to, a data size (or a volume or a data transfer amount), a data transmission rate, a data attribute, an AP status, a user input, a capacity (or availability) of a storage device where data goes through between the electronic device 201 and the external device, information about whether a network of the electronic device 101 is the same as a network of the storage device, or their combination.

In step 503, the electronic device 101 (e.g., the processor 210) can select at least one of the supported frequency bands or at least one of communication paths supported, at least based on the confirmed context information.

In step 504, the electronic device 101 (e.g., the processor 210) can communicate with the external device using the at least one frequency band or communication path selected.

The electronic device 101 confirms the context information and selects at least one of the frequency bands according to whether the confirmed context corresponds to the preset condition. For example, the AP may confirm the context information and communicate with the electronic device 101 using the 2.4 GHz frequency band, the 5 GHz frequency band, or the mmWave frequency band (e.g., 60 GHz, 28 GHz, 32 GHz, 38 GHz, etc.) according to whether the confirmed context corresponds to the preset condition. When the AP confirms the context information and performs the communication according to whether the confirmed context corresponds to the preset condition, the AP can further include the component (e.g., the processor 210, the determination module 450, and the enabler 460) of FIG. 4. For example, when the cloud client may confirm the context information and conduct the communication using at least one of the frequency bands according to whether the confirmed context corresponds to the preset condition.

Steps 503 and 504 are described in more detail with respect to FIG. 6 through FIG. 9.

Figure 6:
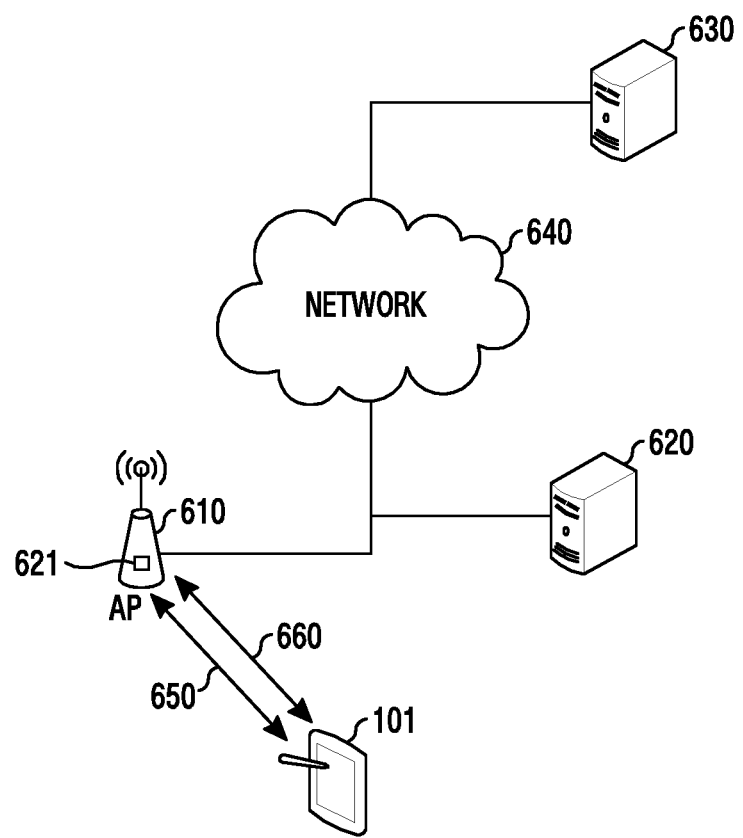
FIG. 6 is a diagram of an electronic device for selecting a frequency band for communication, according to an embodiment of the present disclosure.

FIG. 6 is a diagram of an electronic device for selecting a frequency band for communication, according to an embodiment of the present disclosure.

Referring to FIG. 6, the electronic device 101 can communicate with an external device 630 via an AP 610. For example, the electronic device 101 sends data to the AP 610, the AP 610 forwards the data to the external device 630 over a network 640, and thus the data can be delivered to the external device 630. For example, the electronic device 101 sends data to the AP 610, the AP 610 forwards the data to a storage device 620, the storage device 620 forwards the data to the external device 630, and thus the data can be delivered to the external device 630.

The AP 610 supports, but is not limited to, WLAN. For example, the electronic device 101 can communicate with the external device 630 via a base station which supports cellular communication. For example, an electronic device (e.g., a group client) can communicate with the external device 630 via another electronic device (e.g., a group owner) which supports a hotspot function.

The external device 630 can be a cloud server. The storage device 620 can be, but is not limited to, a home cloud server (or an office cloud server). For example, the external device 630 or the storage device 620 can include any device capable of storing data.

The electronic device 101 and the storage device 620 can reside in coverage of the AP 610.

A storage device 621 can be included in the AP 610. For example, the storage device 621 can be embodied as a buffer in the AP 610.

The storage device 620 can be functionally connected with the AP 610. For example, the storage device 620 can be connected to the AP 610 by wire or wirelessly.

The storage device 620 can include an electronic device connected over a network.

The network 640 can include, but is not limited to, a WAN or a backhaul network (e.g., 3G, 4G, 5G, LTE, LTE-A, etc.). For example, the network 640 can include a mobile communication network. For example, the network 640 can include a WLAN using an AP.

The electronic device 101 can perform wireless communication (e.g., WLAN communication) with the AP 610 (e.g., a Wi-Fi AP) using at least some of the supported frequency bands. For example, the electronic device 101 can communicate with the AP 610 using the 2.4 GHz or 5 GHz frequency band. To communicate using the 2.4 GHz or 5 GHz frequency band, the electronic device 101 can establish a first communication connection 650 with the AP 610.

For example, the electronic device 101 can communicate with the AP 610 using the 60 GHz frequency band. To communicate using the 60 GHz frequency band, the electronic device 101 can establish a second communication connection 660 with the AP 610.

The communication is not limited to those communication connections. For example, the first communication connection 650 can use a frequency band close (or analogous) to 2.4 GHz or 5 GHz. For example, the second communication connection 660 can use a frequency band close to the 60 GHz frequency band. According to one embodiment, the second communication connection 660 can use mmWave of 30 GHz through 300 GHz frequency band.

To select at least one (e.g., 60 GHz frequency band) of the frequency bands supported by the electronic device 101 at least based on the context information, the electronic device 101 can determine whether the context information corresponds to a preset condition (or policy). For example, the electronic device 101 can determine whether the context information confirmed in step 501 of FIG. 5, for example, the data size (or the volume or the data transfer amount), the data transmission rate, the data type, the setting of the electronic device 101, the type of the executed application (or the application protocol), the battery status (e.g., the remaining power of the battery) of the electronic device 101, the setting of the AP which delivers data from the electronic device 101, the AP status, or their combination corresponds to a preset condition. For example, the electronic device 101 can determine whether a battery level, a location, a signal level, or their combination of the electronic device 101 corresponds to a preset condition.

When the context information does not correspond to the preset condition, the electronic device 101 can select, for example, the 2.4 GHz or 5 GHz frequency band for the communication. When selecting the 2.4 GHz or 5 GHz frequency band, the electronic device 101 can establish the first connection 650 with the AP 610.

When the context information corresponds to the preset condition, the electronic device 101 can select, for example, the 60 GHz frequency band for the communication. When selecting the 60 GHz frequency band, the electronic device 101 can establish the second connection 660 with the AP 610.

The electronic device 101 can communicate with the AP 610 using the 2.4 GHz or 5 GHz frequency band as a default frequency band.

When the first communication connection 650 is established between the electronic device 101 and the AP 610, the electronic device 101 can select, for example, the 60 GHz frequency band for the communication. As maintaining the first communication connection 650, the electronic device 101 can establish the second communication connection 660. For example, without releasing the first communication connection 650 from the AP 610, the electronic device 101 can establish the second communication connection 660 with the AP 610.

Figure 10:
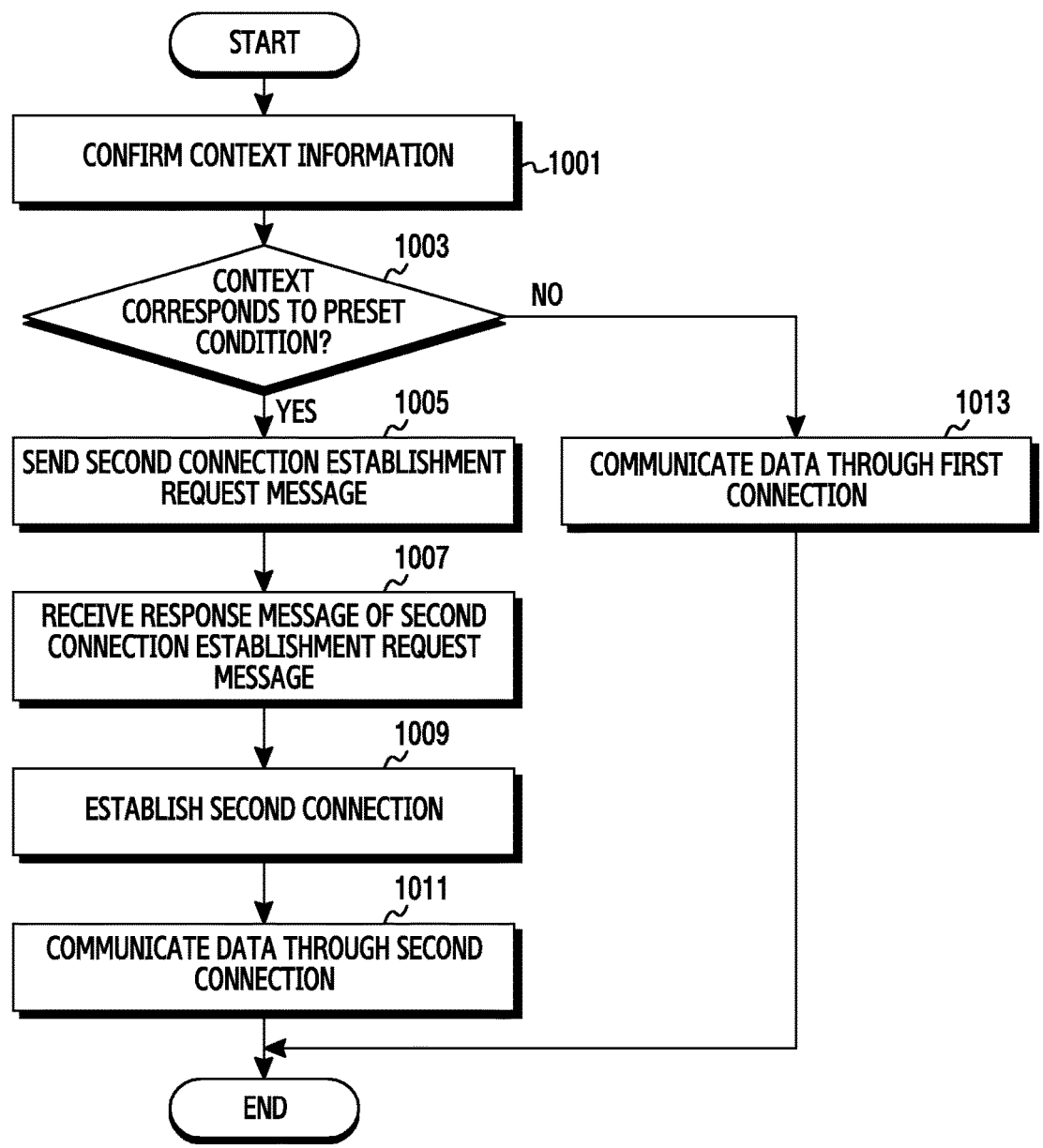
FIG. 10 is a flowchart of an adaptive communication method of an electronic device, according to an embodiment of the present disclosure.

The electronic device 101 can select at least one of the supported frequency bands at least based on the confirmed context information, which shall be explained in further detail by referring to FIG. 10.

Figure 7:
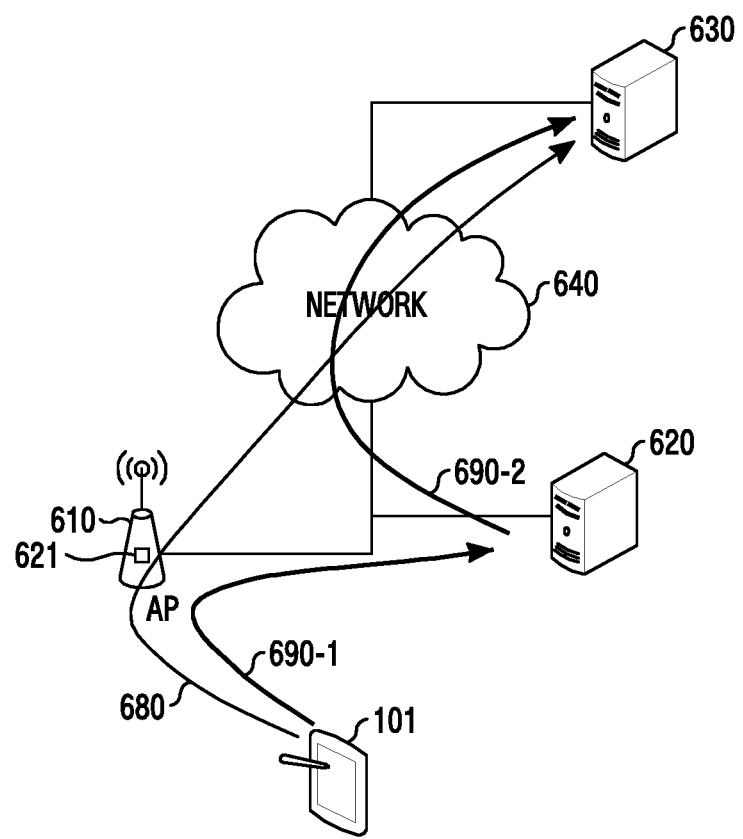
FIG. 7 is a diagram of an electronic device for selecting a communication path for communication, according to an embodiment of the present disclosure.

FIG. 7 is a diagram of an electronic device for selecting a communication path for communication, according to an embodiment of the present disclosure.

Referring to FIG. 7, the electronic device 101 can communicate with an external device 630 using at least one of communication paths. For example, the communication paths can include a first communication path 680 for connecting the electronic device 101 to the external device 630 via an AP 610 over a network 640, and second communication paths 690-1 and 690-2 for connecting the electronic device 101 to the external device 630 via the AP 610 and a storage device 620 over the network 640.

To select at least one of the communication paths, the electronic device 101 can determine whether the context information corresponds to a preset condition (or policy). For example, the electronic device 101 can determine whether the context information confirmed in step 501 of FIG. 5, for example, a data size (or a volume or a data transfer amount), a data transmission rate, a data attribute, a status of the AP 610, a user input, a capacity (or availability)

of the storage device 620 where data goes through between the electronic device 101 and the external device 630, information about whether a network of the electronic device 101 is the same as a network of the storage device 620, or their combination.

A speed of the network 640 (e.g., a backhaul) is compared with a speed between the AP and the electronic device and, when a speed difference is considerable, data can be stored in the storage device 620 and then transmitted. When the speeds are analogous, the data can be transmitted directly to the external device 630 without storing it in the storage device 620. For example, the electronic device 101 can compare a transmission rate between the AP 610 and the external device 630 over the network 640 with a transmission rate between the electronic device 101 and the AP 610. When the transmission rate between the electronic device 101 and the AP 610 is greater than the transmission rate between the AP 610 and the external device 630 by a preset threshold, the electronic device 101 can store data in the storage device 620 and then transmit the data to the external device 630 over the network 640. When the difference of the transmission rate between the electronic device 101 and the AP 610 and the transmission rate between the AP 610 and the external device 630 falls below the preset threshold, the electronic device 101 can transmit data directly to the external device 630 without storing it in the storage device 620.

When the context information corresponds to the preset condition, the electronic device 101 can communicate with the external device 630 through the second communication path 690-1 and 690-2. For example, when a data size exceeds a preset size, the electronic device 101 can select the second communication path 690-1 and 690-2 so that it transmits data to the storage device 620 through the communication path 690-1 using the AP 610 and the storage device 620 forwards the data from the electronic device 101 to the external device 630 through the communication path 690-2.

The electronic device 101 can measure a realtime data transmission rate and transmit data through the first communication path 680 or the second communication path 690-1 and 690-2 according to whether the transmission rate changes. For example, when the data transmission rate is too low in the realtime measurement, the electronic device 101 can switch to the path which stores data in the storage device 620, in the process of the transmission.

When the context information does not correspond to the preset condition, the electronic device 101 can communicate with the external device 630 through the first communication path 680 or the second communication path 690-1 and 690-2. For example, when the data size falls below a preset size, the electronic device 101 can select the first communication path 680 to transmit data to the external device 630 over the network 640. For example, when the data size falls below the preset size, the electronic device 101 can select the second communication path 690-1 and 690-2 to transmit data to the external device 630 via the AP 610 over the network 640.

Figure 13:
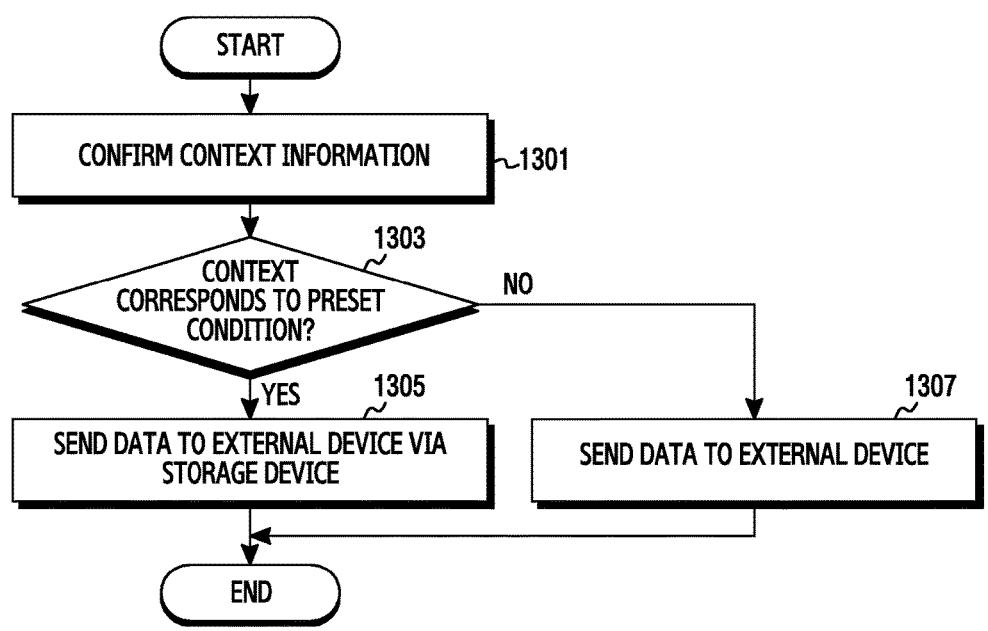
FIG. 13 is a flowchart of an adaptive communication method of an electronic device, according to an embodiment of the present disclosure.

The operation of the electronic device 101 for selecting at least one of the communication paths based on the confirmed context information is described in more detail with respect to FIG. 13.

The operation of the electronic device 101 for selecting the communication frequency band in FIG. 6 and the operation of the electronic device 101 for selecting at least one of the communication paths in FIG. 7 can be performed independently, sequentially, or concurrently. For example, to select the first communication path 680 and to communicate with the AP 610 through the selected first communication path 680, the electronic device 101 can select a first frequency band or a second frequency band. For example, to select the second communication path 690-1 and 690-2 and to communicate with the AP 610 through the selected second communication path 690-1 and 690-2, the electronic device 101 can select a first frequency band or a second frequency band.

Figure 8:
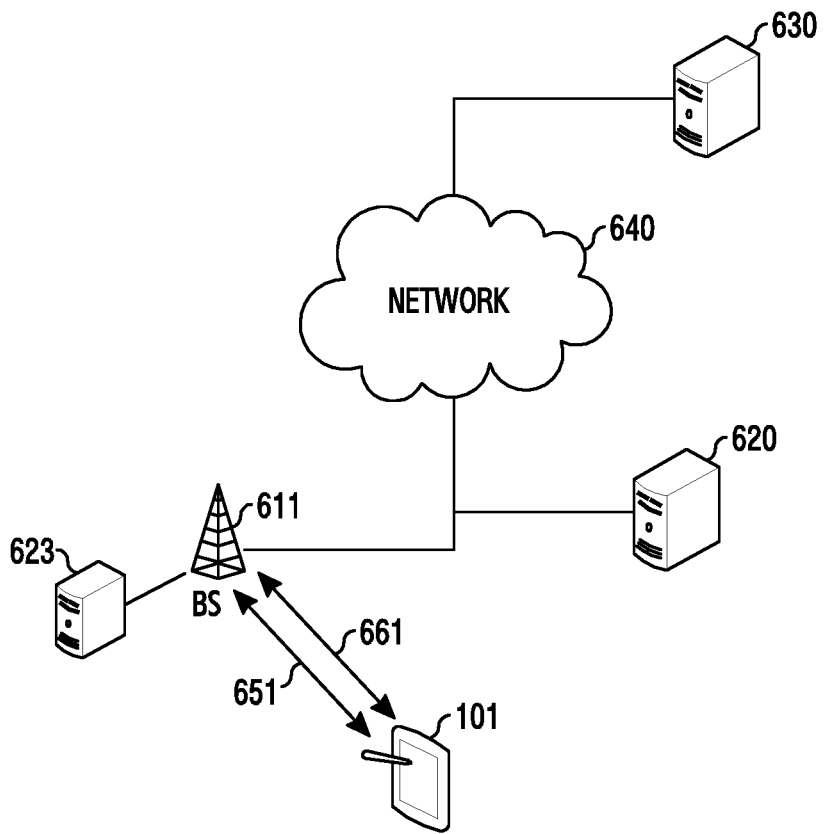
FIG. 8 is a diagram of an adaptive communication method of an electronic device, according to an embodiment of the present disclosure.

FIG. 8 is a diagram of an adaptive communication method of an electronic device, according to an embodiment of the present disclosure.

The electronic device 101 can communicate with an external device 630 via a Base Station (BS) 611. For example, the electronic device 101 transmits data to the BS 611, the BS 611 forwards the data to the external device 630 over a network 640, and thus the data can be delivered to the external device 630. For example, the electronic device 101 transmits data to the BS 611, the BS 611 forwards the data to a storage device 620, the storage device 620 forwards the data to the external device 630, and thus the data can be delivered to the external device 630. For example, the electronic device 101 can transmit data directly to the external device 630 over the network 640.

The electronic device 101 and the storage device 620 can reside in communication coverage of the BS 611. According to another embodiment, the storage device 620 can be included in the BS 611. For example, the storage device 620 can be functionally connected with the BS 611. For example, a storage device 623 can be connected to the BS 611 by wire. For example, besides the base station 611, the storage device 620 can be connected to a home cloud (or an office cloud). The storage device 620 can be realized as a buffer in the AP 610. According to one embodiment, the storage device 620 can include a storage device connected over the network.

The electronic device 101 can wirelessly communicate with a BS (e.g., cellular communication) using at least some of the supported frequency bands.

When the context information corresponds to a preset condition, the electronic device 101 can select at least one of frequency bands and communicate with the BS 611 using the selected frequency band.

When the context information corresponds to a preset condition, the electronic device 101 can select at least one of communication paths for the data communication between the electronic device 101 and the external device 630 and communicate with the external device 630 using the selected at least one communication path.

The operation of the electronic device 101 for selecting at least one frequency band (e.g., 1.8 GHz, 2 GHz. etc.) or at least one communication path and communicating with the external device 630 (or the BS) using the selected at least one frequency band or communication path in FIG. 8 can be the same as or analogous to the operation of the electronic device 101 for communicating via the AP 610 in FIGS. 6 and 7, and its detailed explanation shall be omitted.

A mobile edge computing (MEC) server considered by MEC as a storage server, which is equivalent to the storage device 620, can perform the same or analogous role. For example, the MEC server can include a local cache for storing data.

Figure 9:
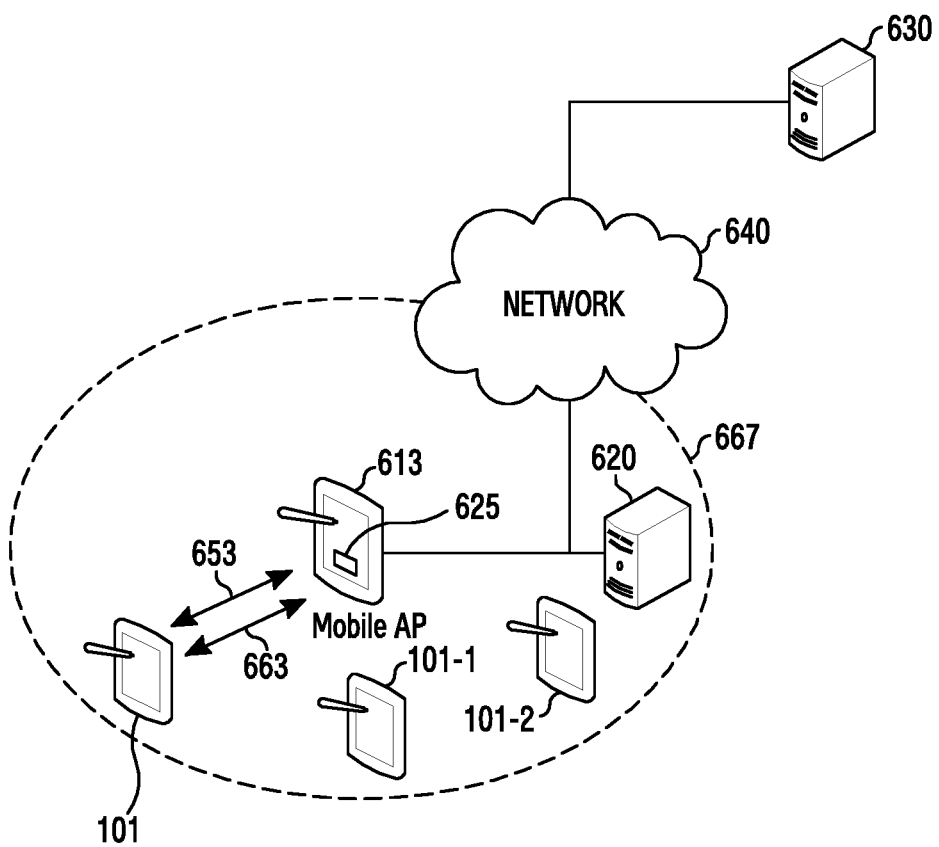
FIG. 9 is a diagram of an adaptive communication method of an electronic device, according to an embodiment of the present disclosure.

FIG. 9 is a diagram of an adaptive communication method of an electronic device, according to an embodiment of the present disclosure.

Referring to FIG. 9, the electronic device 101 can communicate with an external device 630 via another electronic device 613 which supports a hotspot function. The electronic device 101, other electronic devices 101-1 and 101-2, and a mobile AP (or an electronic device serving as a mobile AP) can include a soft AP for communication. The electronic device 101, the other electronic devices 101-1 and 101-2, and the electronic device 613 serving as a mobile AP can include a module for supporting Wi-Fi direct communication.

Storing data in the storage device in the electronic device used as the mobile AP can also include storing data in the storage device functionally connected outside the mobile AP. The storage device can be connected and communicate with the external device 630 through a separate communication path.

Through group formation among the electronic device 101, the other electronic devices 101-1 and 101-2, and the electronic device 101 serving as the mobile AP 613, the mobile AP 613 can serve as a group owner and the electronic device 101 and the other electronic devices 101-1 and 101-2 can serve as group clients.

The electronic device 101 and the other electronic devices 101-1 and 101-2 can reside in a communication range supported by the mobile AP 613.

The electronic device 101 can select at least one of its frequency bands and communicate with the mobile AP 613 using the selected at least one frequency band. The electronic device 101 can communicate with the mobile AP 613 using the 2.4 GHz or 5 GHz frequency band. The electronic device 101 can also communicate with the mobile AP 613 using 60 GHz frequency band. The electronic device 101 can define the 2.4 GHz or 5 GHz frequency band as a default frequency band. For example, when the context information corresponds to a preset condition (e.g., a preset condition to use the 60 GHz frequency band), the electronic device 101 can activate a module for using the 60 GHz frequency band and notify the mobile AP 613 that the module for using the 60 GHz frequency band is activated, using the preset 2.4 GHz or 5 GHz frequency band. When activating the module for using the 60 GHz frequency band, the electronic device 101 can establish a communication connection with the mobile AP 613 for the communication using the 60 GHz frequency band. The electronic device 101 can communicate with the mobile AP 613 through the communication connection using the 60 GHz frequency band. Upon setting the communication connection using the 60 GHz frequency band, the electronic device 101 can maintain the communication connection using, but is not limited to, the 2.4 GHz or 5 GHz frequency band which is the default frequency band. The electronic device 101 can connect the communication with the mobile AP 613 using, for example, Bluetooth, 3G, LTE (e.g., 1.8 GHz), and Zigbee.

When the electronic device 101 transmits data to the mobile AP 613, the mobile AP 613 can forward the data to the external device 630 over the network 640. The network 640 can include a WAN or a backhaul network 640 (e.g., 3G, 4G, 5G, LTE, LTE-A, etc.).

When completing the data transmission to the external device 630, the electronic device 101 can deactivate (or release) the module for using the 60 GHz frequency band.

To receive (or download) data from the external device 630, the electronic device 101 can receive the data from the external device 630 via the network 640 and the mobile AP 613.

A storage device 620 can be positioned in hotspot coverage supported by the mobile AP 613. The storage device 620 can be functionally connected to the mobile AP 613. For example, the storage device 620 can be realized as a buffer in the mobile AP 613. A storage device 625 can be included in the mobile AP 613.

The operation of the electronic device 101 for selecting at least one frequency band or at least one communication path and communicating with the external device 630 (or the mobile AP 613) using the selected at least one frequency band or communication path can be the same as or analogous to the operation of the electronic device 101 for communicating via the AP 613 in FIGS. 6 and 7, and its detailed explanation shall be omitted.

FIG. 10 is a flowchart of an adaptive communication method of an electronic device, according to an embodiment of the present disclosure.

Referring to FIG. 10, in step 1001, the electronic device 101 (e.g., the processor 210) can confirm its context information.

The context information can include context information for selecting at least one of frequency bands supported by the electronic device 101. For example, the context information can include, but is not limited to, a data size (or a volume or a data transfer amount), a data transmission rate, a data type, setting of the electronic device 101, a type of an application (or an application protocol) executed, a battery status (e.g., a remaining power of a battery) of the electronic device 101, setting of an AP which delivers data from the electronic device 101, an AP status, or their combination. For example, the context information can include a battery level of the electronic device 101, a location, a signal level, or their combination.

In step 1003, the electronic device 101 (e.g., the processor 210) can determine whether the confirmed context information corresponds to a preset condition. Hereafter, the condition is assumed to define that the electronic device 101 communicates with an AP using 60 GHz frequency band at least based on the confirmed context information.

While the AP is illustrated in FIG. 10, the present disclosure is not limited to the AP. For example, those skilled in the art shall understand that the AP can be replaced by a BS or a mobile AP.

When the context information includes the data size (or the volume or the data transmission amount) and a data size destined for an external device exceeds a preset data size, the electronic device 101 can determine that the context information corresponds to the preset condition (e.g., the preset condition for using the 60 GHz frequency band). For example, when the data size exceeds 1 Gbytes, the electronic device 101 can set the condition of communicating with the AP using the 60 GHz frequency band. For example, when the size of data to transmit is 100 Mbytes, the electronic device 101 can determine that the context information does not correspond to the preset condition. When the size of the data to transmit is 10 Mbytes, the electronic device 101 can determine that the context information corresponds to the preset condition. When the data size exceeds a preset data size, the electronic device 101 can estimate (or measure) a time taken to transmit the data. For example, the electronic device 101 can estimate the time taken to transmit the data by transmitting test data (or a test frame or a test packet) to a target external device. When the estimated time taken to transmit the data exceeds a preset time, the electronic device 101 can determine that the data size corresponds to the preset condition for the communication using the 60 GHz frequency band. When the 60 GHz frequency band is used for the data transmission, the communication can be performed more rapidly than 2.4 GHz or 5 GHz frequency band.

When the context information is the data transmission rate, the electronic device 101 can measure its data transmission rate and determine whether the context information corresponds to a preset condition (e.g., a condition of using 60 GHz frequency band) at least based on the measured data transmission rate. For example, when a backhaul speed or a WAN speed supported by the current network falls below a preset transmission rate, the electronic device 101 can determine that the context information corresponds to the preset condition to transmit data more rapidly. For example, when the data transmission rate is below the preset transmission rate, the electronic device 101 can determine that the data transmission rate corresponds to a preset condition of communicating using the 60 GHz frequency band which is faster than the 2.4 GHz or 5 GHz frequency band. The electronic device 101 can confirm the data transmission rate in realtime. The electronic device 101 can select the frequency band by considering the realtime data transmission rate. For example, when the data transmission rate is below the preset transmission rate and the communication is performed using the 60 GHz frequency band, the electronic device 101 can determine whether the data transmission rate changes over the preset transmission rate in real-time. When the data transmission rate changes over the preset transmission rate, the electronic device 101 can switch the communication from the 60 GHz frequency band to the 2.4 GHz or 5 GHz frequency band.

When the context information is the data type and data to transmit corresponds to a preset data type, the electronic device 101 can determine that the data type correspond to a preset condition (e.g., a condition of using 60 GHz frequency band). For example, the electronic device 101 can determine at least one of a video file, an audio file, an image file, a document file, compression, a compression type, and an extension type, as the data type for the communication using the 60 GHz frequency band. The user can determine the data type. When the data type requires real-time transmission, the electronic device 101 can determine that the data type corresponds to the condition of communicating using the 60 GHz frequency band. When data requires security, the processor can determine that the data type corresponds to the condition of communicating using the 60 GHz frequency band. For example, when data is a security document or a user private information document, the processor can determine that the data type corresponds to the condition of communicating using the 60 GHz frequency band.

When the context information is the setting of the electronic device 101, the processor can determine whether the setting of the electronic device 101 corresponds to a preset condition. For example, when giving priority to the 60 GHz frequency band among the 2.4 GHz or 5 GHz frequency band and the 60 GHz frequency band, the electronic device 101 can determine that the context information corresponds to the preset condition. For example, when giving priority to the 2.4 GHz or 5 GHz frequency band among the 2.4 GHz or 5 GHz frequency band and the 60 GHz frequency band, the electronic device 101 can determine that the context information does not correspond to the preset condition.

When the context information is the executed application (or application protocol) type and the executed application corresponds to a preset application type, the electronic device 101 can determine that the context information correspond to a preset condition (e.g., a condition of using 60 GHz frequency band). For example, the electronic device 101 can determine at least one of Internet, a web application, a messenger, a call, an audio player/editor, and a video player/editor, as the application type for communicating using the 60 GHz frequency band. The user can determine the condition of the executed application type.

When the context information is the battery status (e.g., the remaining power of the battery), the electronic device 101 can check the battery status. When the battery is charged over a preset level, the electronic device 101 can determine that the context information corresponds to a preset condition. For example, when the battery is charged over the preset level, the electronic device 101 can determine that its battery status corresponds to the preset condition of communicating using the 60 GHz frequency band which consumes more power than the 2.4 GHz or 5 GHz frequency band.

Previous frequency settings can be managed in a database, and, upon a corresponding context, a previous history can be retrieved and the frequency can be changed to the previous setting. For example, the electronic device 101 can store a history of the frequency band used for a particular content execution, a particular application execution, a particular time, and a particular data transmission. When executing a particular content, executing a particular application, confirming a particular time, or transmitting particular data, the electronic device 101 can change the setting to use the frequency band used in the same context based on the history search. According to another embodiment, when the context information is the AP setting, the processor can determine the AP setting corresponds to a preset condition. For example, the communication can be set to use the 2.4 GHz or 5 GHz frequency band when the number of the electronic devices 101 accessing the AP exceeds a preset number, and to use the 60 GHz frequency band when the number of the electronic devices 101 accessing the AP falls below the preset number. The electronic device 101 can check the AP setting and, when the number of the electronic devices 101 accessing the AP falls below the preset number, determine that the AP setting corresponds to the preset condition of the communication using the 60 GHz frequency band. For example, the AP setting can include a password for the AP access. For example, when the AP sets an access password, the electronic device 101 checks the AP setting. When the password is set, the electronic device 101 can determine that the AP setting corresponds to the preset condition of the communication using the 60 GHz frequency band. For example, the AP setting can include AP access authority. When the electronic device 101 is authorized to access the AP (e.g., having an AP access account), the electronic device 101 can determine that the AP setting corresponds to the preset condition of the communication using the 60 GHz frequency band. For example, when the electronic device 101 is not authorized to access the AP (e.g., having no AP access account), the electronic device 101 can determine that the AP setting does not correspond to the preset condition of the communication using the 60 GHz frequency band.

When the context information is the battery level of the electronic device 101, the location, the signal level, or their combination, the processor can determine whether the AP setting corresponds to a preset condition. For example, when an obstacle lies between the electronic device 101 and the AP, the signal level can reduce. When the obstacle lies between the electronic device 101 and the AP, the processor can determine that the AP setting does not correspond to the preset condition of the communication using the 60 GHz frequency band.

When determining that the context corresponds to the preset condition in step 1003, the electronic device 101 can send to the AP a message requesting to establish a second communication connection using the 60 GHz frequency band in step 1005. Upon receiving the message requesting the second communication connection establishment, the AP can activate a module (or a module for using the 60 GHz frequency band) for the establishing the second communication connection.

In step 1007, the electronic device 101 can receive from the AP a response message of the second communication connection establishment request message. The response message of the second communication connection establishment request message can include information for the second communication connection establishment.

In step 1009, the electronic device 101 can establish the second communication connection with the AP. When a first communication connection using the 2.4 GHz or 5 GHz frequency band is established between the electronic device 101 and the AP, the electronic device 101 can build the second communication connection with the AP while, but not limited to, maintaining (or without releasing) the first communication connection. For example, the electronic device 101 can release the first communication connection from the AP and build the second communication connection.

In step 1011, the electronic device 101 can communicate data with the AP through the second communication connection.

When the context does not correspond to the preset condition, the electronic device 101 can communicate data with the AP using the first communication connection in step 1013.

When the first communication connection is established between the electronic device 101 and the AP, the electronic device 101 can maintain the established first communication connection. For example, the electronic device 101 can communicate with the AP using the established first communication connection.

When the first communication connection is not established between the electronic device 101 and the AP, the electronic device 101 can send a first communication connection establishment request message to the AP. When receiving a response message of the first communication connection establishment request message from the AP, the electronic device 101 can establish the first communication connection with the AP. The electronic device 101 can communicate with the AP using the established first communication connection.

In FIG. 10, the electronic device 101 communicates with the AP using the first communication connection or the second communication connection according to, but is not limited to, whether the context of the electronic device 101 corresponds to the condition of using the 60 GHz frequency band.

For example, the electronic device 101 can communicate with the AP using the first communication connection or the second communication connection according to whether the context of the electronic device 101 corresponds to the condition of using the 2.4 GHz or 5 GHz frequency band.

For example, the electronic device 101 can communicate with the AP using the first communication connection or the second communication connection according to whether its context corresponds to the condition of using the 60 GHz frequency band or the condition of using the 2.4 GHz or 5 GHz frequency band. When the context corresponds to neither of the condition of using the 60 GHz frequency band and the condition of using the 2.4 GHz or 5 GHz frequency band, the electronic device 101 can communicate with the AP using the default communication connection (e.g., the first communication connection).

In FIG. 10, the electronic device 101 confirms the context information and communicates with the AP using the first communication connection or the second communication connection according to whether the confirmed context corresponds to the preset condition. For example, the AP may confirm the context information and communicate with the electronic device 101 using the first communication connection or the second communication connection according to whether the confirmed context corresponds to the preset condition. When the AP confirms the context information and communicates according to whether the confirmed context corresponds to the preset condition, the AP can further include the components (e.g., the processor 210, the determination module 450, and the enabler 460) of FIG. 4. For example, the cloud client may confirm the context information and communicate with the electronic device 101 using the first communication connection or the second communication connection according to whether the confirmed context corresponds to the preset condition.

Figure 11:
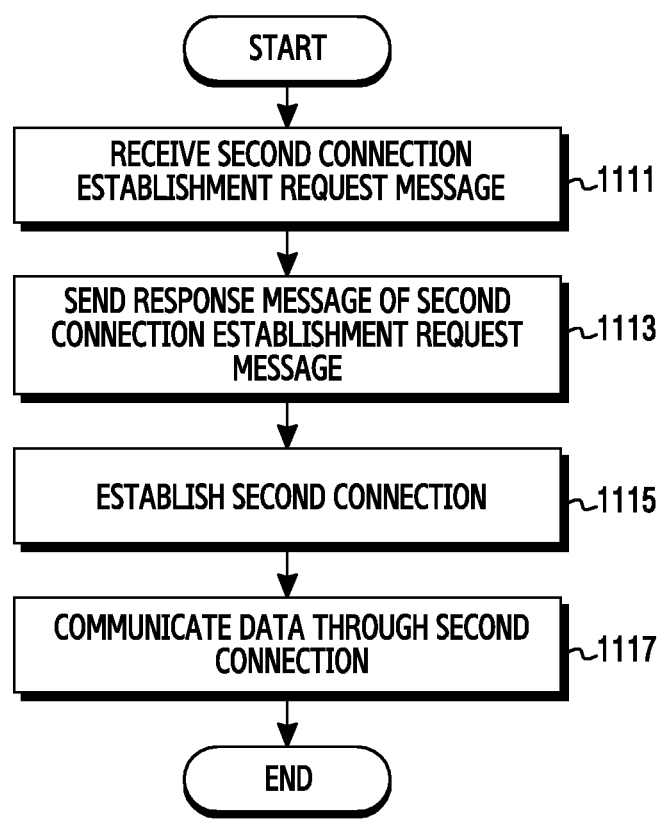
FIG. 11 is a flowchart of an adaptive communication method of an access point (AP), according to an embodiment of the present disclosure.

FIG. 11 is a flowchart of an adaptive communication method of an access point (AP), according to an embodiment of the present disclosure.

Referring to FIG. 11, in step 1111, the AP can receive from an electronic device 101 a message requesting to establish a second communication connection for communicating using a 60 GHz frequency band. For example, when the electronic device 101 determines that the context corresponds to a preset condition, the AP can receive the second communication connection request message from the electronic device 101.

When receiving the second communication connection request message from the electronic device 101, the AP can activate a module for setting the second connection. For example, to activate the 60 GHz frequency band, an enabler of the AP can activate at least one of a baseband module, a transmitter, a receiver, an LO, a switch, and an antenna. The AP can generate information (e.g., Internet Protocol (IP) address) required for the second connection establishment with the electronic device 101.

In step 1113, the AP can send a response message of the second communication connection establishment request message to the electronic device 101. For example, the AP can transmit the necessary information for the second connection establishment to the electronic device 101.

In step 1115, the AP can establish the second connection with the electronic device 101. For example, the AP can establish the second connection using the 60 GHz frequency band.

When a first communication connection using the 2.4 GHz or 5 GHz frequency band is established between the electronic device 101 and the AP, the AP can build the second communication connection while, but not limited to, maintaining the first communication connection. For example, the AP can build the second communication connection without releasing the first communication connection. For example, when the second connection is built with the electronic device 101, the AP may release the first communication connection.

In step 1117, the AP can communicate with the electronic device 101 using the established second connection.

Figure 12:
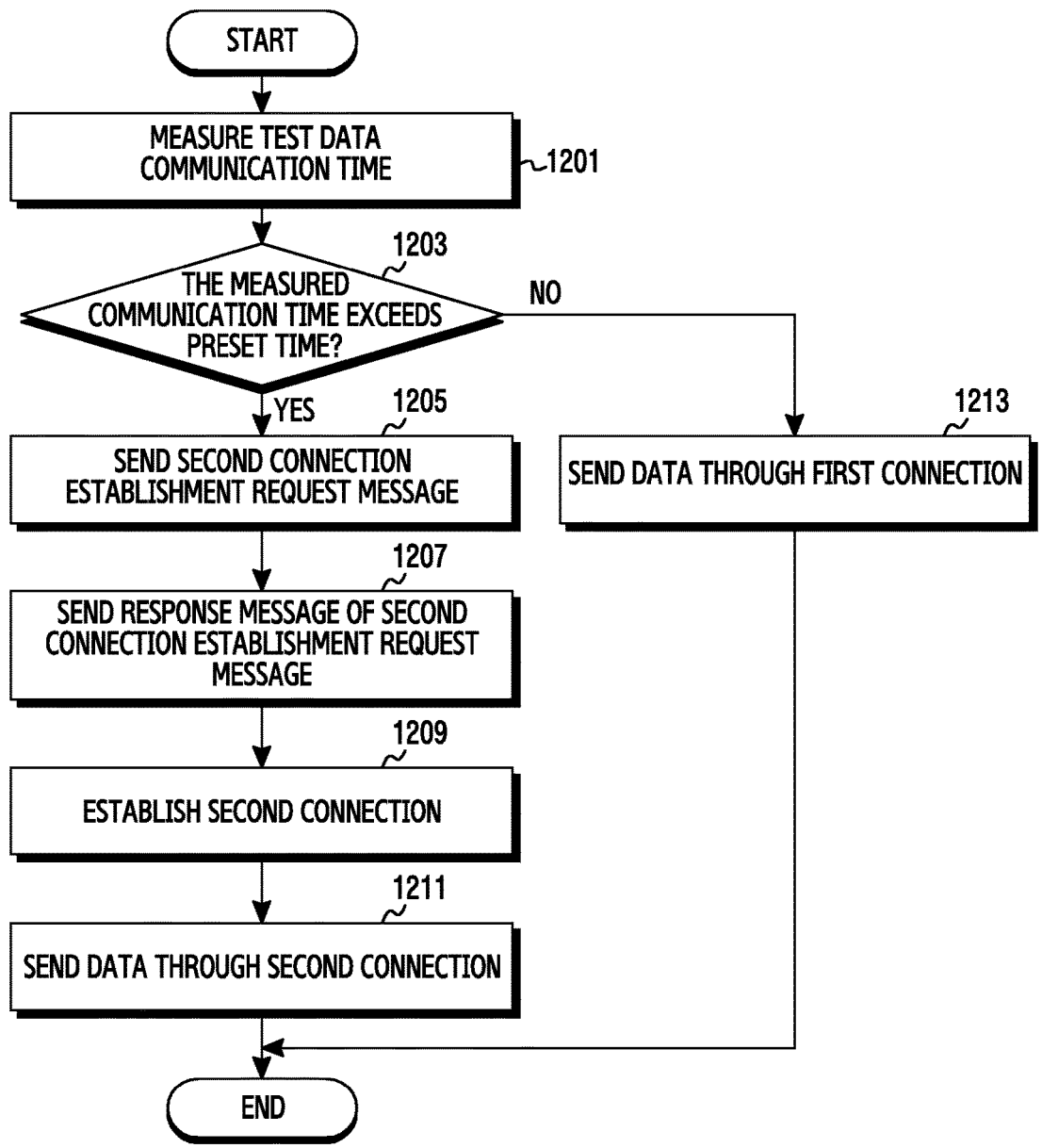
FIG. 12 is a flowchart of an adaptive communication method of an electronic device, according to an embodiment of the present disclosure.

FIG. 12 is a flowchart of an adaptive communication method of an electronic device, according to an embodiment of the present disclosure.

Referring to FIG. 12, in step 1201, the electronic device 101 can measure (or estimate) a communication time using test data (or a test frame or a test packet).

When context information includes a data size, a data transmission rate, or a data type, the electronic device 101 can measure the time taken to transmit data by sending the test data to a target external device. For example, the electronic device 101 can transmit the test data to the external device over a network (e.g., a backhaul or a WAN). The test data can be relatively smaller than the data to be transmitted from the electronic device 101 to the external device.

In step 1203, the electronic device 101 can determine whether the measured communication time exceeds a preset time at least based on the test data. The electronic device 101 can determine a communication frequency band based on the measured communication time based on the test data transmission. For example, when the measured communication time based on the test data transmission exceeds the preset time, the electronic device 101 can determine a 60 GHz frequency band having the fast data transmission rate among its supported frequency bands for the communication with an AP, for example, 2.4 GHz or 5 GHz and 60 GHz frequency bands, as the frequency band for the communication with the AP. For example, when the measured communication time based on the test data transmission is below the preset time, the electronic device 101 can determine the 2.4 GHz or 5 GHz frequency band as the frequency band for the communication with the AP. For example, when the measured communication time based on the test data transmission is below the preset time, the electronic device 101 can determine to transmit the data directly to the external device over the network (e.g., the backhaul or the WAN).

When the measured communication time based on the test data exceeds the preset time in step 1203, the electronic device 101 can send to the AP a request message for establishing a second connection for the communication using the 60 GHz frequency band in step 1205.

In step 1207, the electronic device 101 can receive from the AP a response message of the second communication connection establishment request message. In step 1209, the electronic device 101 can establish the second communication connection with the AP. In step 1211, the electronic device 101 can communicate data with the AP through the second communication connection. When the context does not correspond to the preset condition in step 1203, the electronic device 101 can communicate data with the AP using the first communication connection in step 1213. The steps 1205 through 1213 of FIG. 12 are identical or analogous to the steps 1005 through 1013 of FIG. 10, and thus shall not be further explained.

FIG. 13 is a flowchart of an adaptive communication method of an electronic device, according to an embodiment of the present disclosure.

Referring to FIG. 13, the electronic device 101 transmits data to an external device through at least one of communication paths.

For example, the communication paths can include a first communication path for interconnecting the electronic device 101 to the external device over a network (e.g., a backhaul or a WAN), a second communication path for interconnecting the electronic device 101 to the external device via an AP over the network, and a third communication path for interconnecting the electronic device 101 to the external device via the AP and a storage device over the network.

In step 1301, the electronic device 101 can confirm context information. The context information can include, but not limited to, a data size (or a volume or a data transfer amount), a data transmission rate, a data attribute, an AP status, a user input, a capacity (or availability) of a storage device where data goes through between the electronic device 101 and the external device, information about whether a network of the electronic device 101 is the same as a network of the storage device, or their combination.

In step 1303, the electronic device 101 can determine whether the context corresponds to a preset condition.

When the context information includes the data size (or the volume or the data transmission amount) and the data size exceeds a preset size, the electronic device 101 can determine a condition of transmitting the data to the external device through the third path. For example, when the data size exceeds the preset size and the electronic device 101 transmits data through the first communication path or the second communication path, the data transmission to the external device may not be completed according to a communication status or a communication time. When the data size exceeds the preset size, the electronic device 101 can determine a condition such that at least part of the data is transmitted to the storage device via the AP and the AP transmits the at least part of the data to the external device over the network. When receiving the at least part of the data from the electronic device 101 via the AP, the storage device can store at least part of the received data. When the context information includes the data size (or the volume or the data transmission amount), to measure (or estimate) the time taken for the data transmission, the electronic device 101 can transmit test data to the external device over the network. When the time taken for the test data transmission exceeds a preset time, the electronic device 101 can transmit data to the storage device via the AP and the storage device can transmit the received data to the external device over the network.

When the context information includes the data transmission rate and the data transmission rate is below a preset rate, the electronic device 101 can determine a condition of transmitting data to the external device through the third path. For example, when the data transmission rate is below the preset rate and the electronic device 101 transmits data to the external device through the first communication path or the second communication path, the data transmission may not be completed according to the communication status or the communication time. When the data transmission rate is below the preset rate, the electronic device 101 can determine a condition such that at least part of the data destined for the external device is transmitted to the storage device and the storage device transmits at least part of the received data to the external device.

When the context information includes the data attribute, the electronic device 101 can determine whether data corresponds to a preset attribute. For example, at least part of data destined for the external device can require security. The electronic device 101 can set a security level according to the required security. The electronic device 101 can determine whether at least part of the transmit data corresponds to a security document over the preset security level or a document including user private information. When the transmit data includes data over the preset security level, the electronic device 101 can determine a condition of transmitting the data to the external device through the third communication path. The electronic device 101 can determine a condition of storing the data over the preset security level of the transmit data in the storage device and transmitting the rest of the transmit data to the external device. When the transmit data destined for the external device requires the security, the electronic device 101 can determine a condition of transmitting the data to the external device only when the external device is authorized (or approved) or transmitting and storing the data to and in the storage device without transmitting the data to the external device when the external device is not authorized.

When the data attribute requires realtime, the electronic device 101 can determine a condition of transmitting data through the first communication path or the second communication path. For example, when the user of the electronic device 101 works together with a user of at least one other electronic device 101 and the electronic device 101 transmits data requiring the realtime to the external device via the storage device, a delay can occur. When the data does not require the realtime, the electronic device 101 can determine a condition of transmitting data to the external device through the third communication path.

When the context information includes the AP status and the number of the electronic devices 101 accessing the AP exceeds a preset number, the electronic device 101 can determine a condition of transmitting data to the external device through the third path. For example, as the number of the electronic devices 101 accessing the AP increases, the data transmission rate to the electronic device 101 can lower. When the number of the electronic devices 101 accessing the AP exceeds the preset number, the electronic device 101 can determine a condition such that data is transmitted to the storage device and the storage device forwards the data to the external device.

When the context information includes the user input (or user setting), the electronic device 101 can determine a condition of transmitting data to the external device through the first communication path, the second communication path, or third communication path at least based on the user input.

When the context information includes the storage capacity (or available storage capacity) of the storage device and the storage capacity of the storage device is smaller than the transmit data volume, the electronic device 101 can determine a condition of transmitting data to the external device through the first communication path or the second communication path. According to another embodiment, when the storage capacity (or available storage capacity) of the storage device is smaller than the transmit data volume, the electronic device 101 can determine a condition of storing only at least part of the transmit data in the storage device and transmitting the rest of the transmit data to the external device.

When the context information indicates whether the network of the electronic device 101 is the same as the network of the storage device and the storage device accesses other AP than the AP of the electronic device 101, the electronic device 101 can determine a condition of transmitting the transmit data through the first communication path or the second communication path.

When the context corresponds to the preset condition the preset condition of transmitting the data through the third communication path in step 1303, the electronic device 101 can transmit the data to the external device via the storage device in step 1305.

To transmit high-definition or high-volume data to the external device, the electronic device 101 can store (or back up) the high-definition or high-volume data in the storage device and transmit data transcoded to low-definition or low-volume data to the external device over the network (e.g., the backhaul or the WAN). Thus, the electronic device 101 can reduce battery consumption and enhance accessibility to the external device.

When the context does not correspond to the preset condition, for example, the preset condition of transmitting the data through the third communication path, in step 1303, the electronic device 101 can transmit the data to the external device through the first communication path or the second communication path in step 1307.

Figure 14:
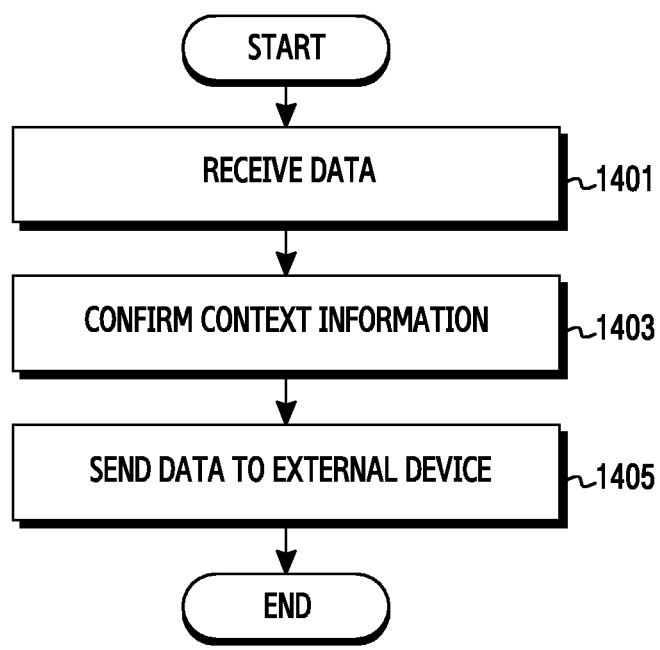
FIG. 14 is a flowchart of an adaptive communication method of a storage device, according to an embodiment of the present disclosure.

FIG. 14 is a flowchart of an adaptive communication method of a storage device, according to an embodiment of the present disclosure.

Referring to FIG. 14, in step 1401, the storage device can receive data from the electronic device 101 via the AP. The storage device can store the received data.

In step 1403, the storage device can confirm the context information. For example, the storage device can include the cloud client. The cloud client can confirm the received data attribute or the storage capacity (or the available storage) of the storage device. When receiving data through, for example, the physical layer (e.g., the communication module), the cloud client can determine the type and the size of the received data using the application layer. According to another embodiment, the cloud client can include the determination module and select at least one communication path or frequency band using the determination module.

In step 1405, the storage device can transmit at least part of the received data to the external device.

When the data attribute requires the realtime, the storage device can store the data received from the AP and concurrently forward the received data to the external device.

When the data attribute requires the security, the storage device can store the data received from the AP in an internal memory without transmitting it to the external device.

The storage device can check its storage capacity, and store only part of the data received from the AP when the available storage is insufficient.

Figure 15:
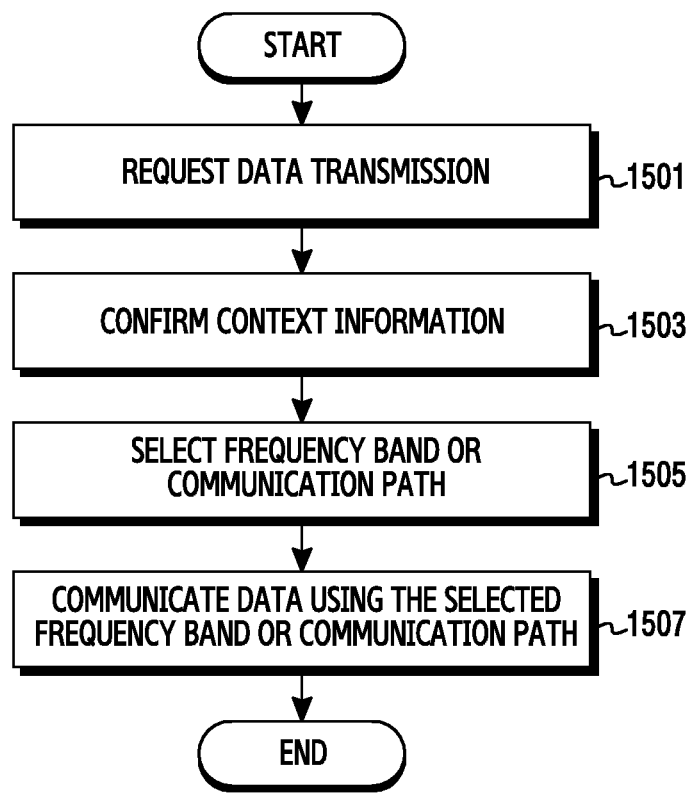
FIG. 15 is a flowchart of an adaptive communication method of an electronic device, according to an embodiment of the present disclosure.

FIG. 15 is a flowchart of an adaptive communication method of an electronic device, according to an embodiment of the present disclosure.

Referring to FIG. 15, the electronic device 101 receives data from the external device in FIG. 15.

In step 1501, the electronic device 101 can receive a user input for requesting data transmission to the external device. For example, the electronic device 101 can receive a user input for downloading data from the external device.

Upon receiving the user input for requesting the data transmission to the external device, the electronic device 101 can measure a communication time required to receive the data by sending test data (or a test frame or a test packet) to the external device.

In step 1503, the electronic device 101 can confirm the context information of the electronic device 101.

The context information can include the context information for selecting at least one of the frequency bands supported by the electronic device 101. For example, the context information can include, but is not limited to, a data size (or a volume or a data transfer amount), a data transmission rate, a data type, setting of the electronic device 101, a type of an application (or an application protocol) executed, a battery status (e.g., a remaining power of a battery) of the electronic device 101, a setting of an AP which delivers data from the electronic device 101, an AP status, or a combination thereof.

The context information can include the context information for selecting the communication path between the electronic device 101 and the external device to which data is transmitted. For example, the context information can include, but is not limited to, a data size (or a volume or a data transfer amount), a data transmission rate, a data attribute, an AP status, a user input, a capacity (or availability) of a storage device where data goes through between the electronic device 101 and the external device, information about whether a network of the electronic device 101 is the same as a network of the storage device, or a combination thereof.

The electronic device 101 can further confirm its storage capacity (or the storable capacity) as the context information.

In step 1505, the electronic device 101 can select at least one of the frequency bands supported by the electronic device 101 or at least one of the communication paths at least based on the confirmed context information.

When the storage capacity of the electronic device 101 is insufficient, the electronic device 101 can transmit the data from the external device to the storage device and the storage device can store the data.

In step 1507, the electronic device 101 can communicate data with the external device using the at least one frequency band or communication path selected.

Figure 16:
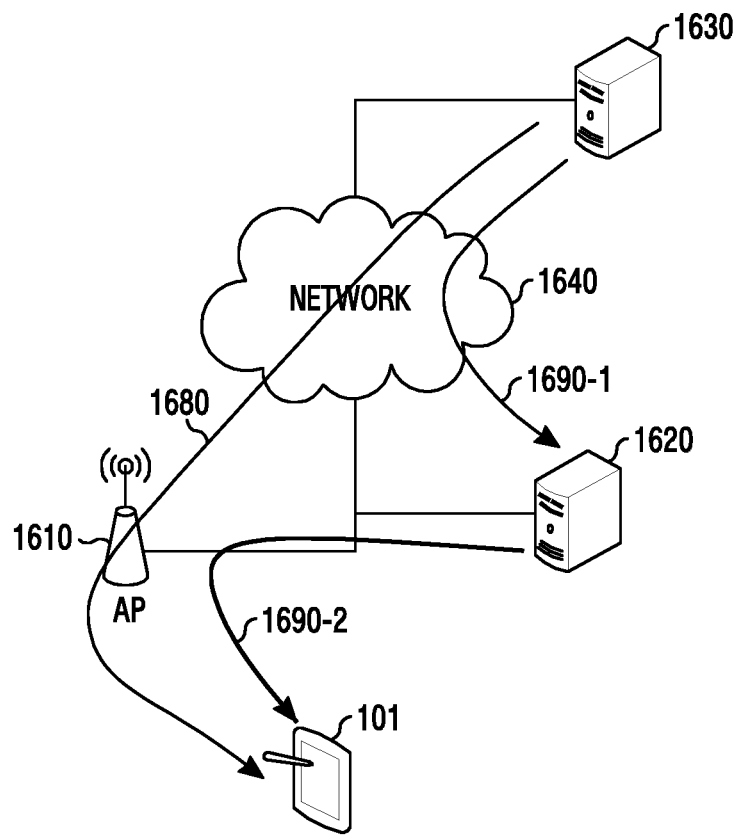
FIG. 16 is a diagram of an adaptive communication method of an electronic device, according to an embodiment of the present disclosure.

FIG. 16 is a diagram of an adaptive communication method of an electronic device, according to an embodiment of the present disclosure.

Referring to FIG. 16, the electronic device 101 can receive data from an external device 1630 through a plurality of communication paths. The electronic device 101 can receive data from the external device 1630 through a first communication path 1680 via a network 1640 and an AP 1610. For example, the electronic device 101 can receive data through second communication paths 1690-1 and 1690-2 connected to the external device 1630 via the network 1640, a storage device 1620, and the AP 1610.

The AP 1610 supports, but is not limited to, the WLAN in FIG. 16. For example, the electronic device 101 can receive data from the external device 1630 via a BS supporting cellular communication. For example, the electronic device 101 (e.g., a group client) can receive data from the external device 1630 via another electronic device 101 (e.g., a group owner) supporting a hotspot function.

The external device 1630 can be, but is not limited to, a cloud server. The storage device 1620 can be, but is not limited to, a home cloud server (or an office cloud server). For example, the external device 1630 or the storage device 1620 can include any device capable of storing data.

The electronic device 101 and the storage device 1620 can reside in coverage of the AP 1610. According to other embodiments, the storage device 1620 can be included in the AP 1610 or functionally connected with the AP 1610.

The network 1640 can include, but is not limited to, a WAN or a backhaul network (e.g., 3G, 4G, 5G, LTE, LTE-A, etc.). For example, the network 1640 can include a mobile communication network. For example, the network 1640 can be a WLAN using the AP.

The electronic device 101 can perform wireless communication (e.g., WLAN communication) with the AP 1610 (e.g., a Wi-Fi AP) using at least some of the supported frequency bands. For example, the electronic device 101 can communicate with the AP 1610 using, but not limited to, a 2.4 GHz or 5 GHz frequency band. For the communication using the 2.4 GHz or 5 GHz frequency band, the electronic device 101 can establish a first communication connection with the AP 1610.

For example, the electronic device 101 can communicate with the AP 1610 using, but is not limited to, a 60 GHz frequency band. For the communication using the 60 GHz frequency band, the electronic device 101 can establish a second communication connection with the AP 1610.

For example, the first communication connection can use a frequency band close (or analogous) to 2.4 GHz or 5 GHz. For example, the second communication connection can use a frequency band close to 60 GHz. The second communication connection can use millimeter wave (mm-wave) of 30 through 300 GHz frequency bands.

To select at least one of the frequency bands supported by the electronic device 101 at least based on the context information, the electronic device 101 can determine whether the context information corresponds to a preset condition (or policy). For example, the electronic device 101 can determine whether the confirmed context information, for example, the data size (or the volume or the data transfer amount), the data transmission rate, the data type, the setting of the electronic device 101, the type of the executed application (or application protocol), the battery status (e.g., the remaining power of the battery) of the electronic device 101, the setting of the AP which delivers data from the electronic device 101, the AP status, or their combination corresponds to the preset condition.

When the context information does not correspond to the preset condition, the electronic device 101 can select, for example, the 2.4 GHz or 5 GHz frequency band for the communication. When selecting the 2.4 GHz or 5 GHz frequency band, the electronic device 101 can establish the first communication connection with the AP 1610.

When the context information corresponds to the preset condition, the electronic device 101 can select, for example, the 60 GHz frequency band for the communication. When selecting the 60 GHz frequency band, the electronic device 101 can establish the second communication connection with the AP 1610.

The electronic device 101 can designate the 2.4 GHz or 5 GHz frequency band as a default frequency band. For example, when the condition for communicating using the 2.4 GHz or 5 GHz frequency band and the condition for communicating using the 5 GHz frequency band are defined and the context information does not correspond to the preset condition, the electronic device 101 can communicate using the 2.4 GHz or 5 GHz frequency band designated as the default frequency band.

When the first communication connection is built between the electronic device 101 and the AP 1610, the electronic device 101 can select, for example, the 60 GHz frequency band for the communication. As maintaining the first communication connection, the electronic device 101 can establish the second communication connection. For example, without releasing the first communication connection, the electronic device 101 can establish the second communication connection.

The processor can select at least one of the frequency bands supported by the electronic device 101 or at least one of the communication paths at least based on the confirmed context information.

To select at least one of the communication paths, the electronic device 101 can determine whether the context information corresponds to a preset condition (or policy). For example, the electronic device 101 can determine whether the confirmed context information, for example, a data size (or a volume or a data transfer amount), a data transmission rate, a data attribute, a status of the AP 1610, a user input, a capacity (or availability) of the storage device 1620 where data goes through between the electronic device 101 and the external device 1630, information about whether the network of the electronic device 101 is the same as a network of the storage device 620, or their combination corresponds to the preset condition.

When the context information corresponds to the preset condition, the electronic device 101 can communicate with the external device 1630 through the second communication path 1690-1 and 1690-2. For example, when the data size exceeds the preset size, the electronic device 101 can receive data from the external device 1630 through the communication paths 1690-1 and 1690-2.

When the context information does not correspond to the preset condition, the electronic device 101 can communicate with the external device 1630 through the first communication path 1680. For example, when the data size exceeds the preset size, the electronic device 101 can select the first communication path 1680 so as to receive data from the external device 1630 via the network 1640 and the AP 1610.

FIGS. 17A to 17C are diagrams of a determination module, according to an embodiment of the present disclosure.

Referring to FIGS. 17A to 17C, a data flow between a mobile device 1710, a WiFi AP/evolved Node B (eNB) 1720, and a server 1730 is shown.

A protocol structure of the mobile device 1710, the WiFi AP/eNB 1720, and the server 1730 can include, but is not limited to, a physical layer, a network layer, a transport layer, and an application layer. For example, the protocol structure of the mobile device 1710, the WiFi AP/eNB 1720, and the server 1730 can include at least part of seven layers of Open Systems Interconnection (OSI) or omit at least one of the OSI seven layers.

The mobile device 1710, the WiFi AP/eNB 1720, and the server 1730 can include a determination module. The determination module can select at least one communication path and at least one of the frequency bands at least based on the context information. The determination module (or the cloud client) can correspond to the application layer. Although not depicted in FIG. 17, the determination module can be included in, but not limited to, the storage device (e.g., a network storage device).

Upon selecting at least one communication path and at least one frequency band, the mobile device 1710 can transmit data to the server 1730 via the AP/eNB 1720.

The mobile device 1710 can forward the data from the application layer 1717 to the transport layer 1715, the network layer 1713, and the physical layer 1711 along an arrow in FIG. 17A. The mobile device 1720 can send data to the physical layer 1721 of the AP/eNB 1720 using the frequency band selected from the multiple frequency bands through the physical layer 1711.

The AP/eNB 1720 can forward the data from the physical layer 1721 to the network layer 1723, the transport layer 1725, and the application layer 1727 along an arrow in FIG. 17B. The AP/eNB 1720 can send data to the physical layer 1731 of the server 1730 through the physical layer 1721.

The server 1730 can forward the data from the physical layer 1731 to the network layer 1733, the transport layer 1735, and the application layer 1727 along an arrow in FIG. 17C.

A method in an electronic device comprising a communication module and a processor can include confirming context information of the electronic device, selecting, at the electronic device, at least one of frequency bands or at least one of communication paths supported by the electronic device, at least based on the context information using the processor, and communicating data between the electronic device and an external electronic device at least based on the at least one frequency band or the at least one communication path using the communication module.

The context information can include a status of the electronic device, an attribute of the data, a status of an access point communicatively connected with the electronic device, a user input, or a combination thereof.

The status of the electronic device can include a battery level of the electronic device, a location, a signal level, or a combination thereof.

The context information can include a size of data to transmit from the electronic device to the external electronic device using the at least one frequency band, a transmission rate of the data, a type of the data, or a combination thereof.

The at least one communication path can include an available communication path between the electronic device and the external electronic device.

The at least one communication path can be established by the electronic device in coordination with another external device of the electronic device.

The at least one communication path can include a first communication path and a second communication path, and communicating the data can be performed using an access point functionally connected with the electronic device when the at least one communication path comprises the first path, and performed using a base station functionally connected with the electronic device when the at least one communication path comprises the second path.

Communicating the data can be performed using a storage device functionally connected to the access point or the base station.

Communicating the data can include, when the size of the data is greater than a preset size or a capacity of a memory functionally connected to the electronic device, storing the data in the storage device.

Determining can include changing the at least one frequency band of the electronic device to a 2.4 GHz, 5 GHz, or mmWave frequency band.

An electronic device can confirm context information in relation to an access point connected to the electronic device or another electronic device, select at least one of frequency bands or at least one of communication paths, which are supported by the another electronic device, at least based on the context information, and transmit information of the at least one frequency band or communication path to the access point or the another electronic device.

The electronic device can further communicate data with the access point or the another electronic device through at least part of the at least one frequency band or at least part of the at least one communication path.

As set forth above, the adaptive communication method and apparatus according to an embodiment of the present disclosure can offer the enhanced data communication by selecting the frequency band or the communication path between the electronic device and the external devices based on various context information (e.g., the data capacity, the transmission rate, etc.).

A data structure used in the embodiments of the present disclosure can be recorded on a computer-readable recording medium using various means. The computer-readable recording medium includes storage media such as magnetic storage media (e.g., a Read Only Memory (ROM), a floppy disc, a hard disc, etc.) and optical readable media (e.g., a Compact Disc (CD)-ROM, a Digital Video Disc (DVD), etc.).

While the present disclosure has been shown and described with reference to certain embodiments thereof, it will be understood by those skilled in the art that various changes in form and details may be made therein without departing from the spirit and scope of the disclosure as defined, not by the detailed description and embodiments, but by the following appended claims and their equivalents.

What is claimed is:

1. A method of an electronic device, the method comprising:
establishing, by a processor of the electronic device, a wireless-fidelity (WiFi) communication connection between the electronic device and an access point (AP) which is connected to an external device;
identifying, by the electronic device, whether a size of data to be transmitted to the external device through the AP is greater than a designated size;
based on identifying that the size of the data is greater than the designated size, transmitting, by the processor, the data to the external device though the AP, using a first frequency band among a plurality of frequency bands which are supported by the WiFi communication connection; and
based on identifying that the size of the data is less than or equal to the designated size, transmitting, by the processor, the data to the external device though the AP, using a second frequency band among the plurality of frequency bands, and
wherein the first frequency band is a higher frequency band than the second frequency band and the plurality of frequency bands comprise at least 2.4 GHz band, 5 GHz band and 60 GHz band.

2. The method of claim 1, further comprising:
identifying whether a transmission rate between the electronic device and the AP is greater than a designated transmission rate;
based on identifying that the transmission rate is less than or equal to the designated transmission rate, transmitting, by the processor, the data to the external device though the AP, using the first frequency band among the plurality of frequency bands; and
based on identifying that the transmission rate is greater than the designated transmission rate, transmitting, by the processor, the data to the external device though the AP, using the second frequency band among the plurality of frequency bands.

3. The method of claim 1, further comprising:
identifying whether a type of the data requires real-time transmission or security;
based on identifying that the type of the data requires real-time transmission or security, transmitting, by the processor, the data to the external device though the AP, using the first frequency band among the plurality of frequency bands; and
based on identifying that the type of the data does not require real-time transmission or security, transmitting, by the processor, the data to the external device though the AP, using the second frequency band among the plurality of frequency bands.

4. The method of claim 1, further comprising:
identifying whether a battery of the electronic device is charged over a designated level;
based on identifying that the battery of the electronic device is charged over the designated level, transmitting, by the processor, the data to the external device though the AP, using the first frequency band among the plurality of frequency bands; and
based on identifying that the battery of the electronic device is charged below the designated level, transmitting, by the processor, the data to the external device though the AP, using the second frequency band among the plurality of frequency bands.

5. The method of claim 1, further comprising:
identifying, by the processor, whether context information corresponds to a designated condition;
based on identifying that the context information corresponds to the designated condition, transmitting, by the processor, the data using an indirect path from the AP through another external device to the external device among a plurality of communication paths from the AP to the external device; and
based on identifying that the context information does not correspond to the designated condition, transmitting, by the processor, the data using a direct path from the AP to the external device among the plurality of communication paths.

6. The method of claim 5, further comprising, based on identifying that the context information corresponds to the designated condition, storing the data in the another external device.

7. The method of claim 5, wherein
the context information includes at least one of a status of the electronic device, an attribute of the data, a status of an access point connected with the electronic device, and a user input.

8. The method of claim 7, wherein the status of the electronic device includes at least one of a battery level of the electronic device, a location, and a signal level.

9. The method of claim 5, wherein
identifying whether the context information corresponds to the designated condition comprises identifying whether a transmission rate between the electronic device and the AP is greater than a transmission rate between the AP and the external device by a designated threshold.

10. An electronic device comprising:
a communication circuit; and
at least one processor configured to:
establish, by using the communication circuit, a wireless-fidelity (WiFi) communication connection between the electronic device and an access point (AP) which is connected to an external device,
identify whether a size of data to be transmitted to the external device though the AP is greater than a designated size,
based on identifying that the size of data is greater than the designated size, transmit the data to the external device though the AP, using a first frequency band among a plurality of frequency bands which are supported by the WiFi communication connection, and
based on identifying that the size of data is less than or equal to the designated size, transmit the data the data to the external device though the AP, using a second frequency band among the plurality of frequency bands, and
wherein the first frequency band is a higher frequency band than the second frequency band and the plurality of frequency bands comprise at least 2.4 GHz band, 5 GHz band and 60 GHz band.

11. The electronic device of claim 10, wherein the at least one processor is further configured to:
identify whether a transmission rate between the electronic device and the AP is greater than a designated transmission rate;
based on identifying that the transmission rate is less than or equal to the designated transmission rate, transmit the data to the external device though the AP, using the first frequency band among the plurality of frequency bands; and based on identifying that the transmission rate is greater than the designated transmission rate, transmit the data to the external device though the AP, using the second frequency band among the plurality of frequency bands.

12. The electronic device of claim 10, wherein the at least one processor is further configured to:

identify whether a type of the data requires real-time transmission or security;

based on identifying that the type of the data requires real-time transmission or security, transmit the data to the external device though the AP, using the first frequency band among the plurality of frequency bands; and based on identifying that the type of the data does not require real-time transmission or security, transmit the data to the external device though the AP, using the second frequency band among the plurality of frequency bands.

13. The electronic device of claim 10, wherein the at least one processor is further configured to:

identify whether a battery of the electronic device is charged over a designated level;

based on identifying that the battery of the electronic device is charged over the designated level, transmit the data to the external device though the AP, using the first frequency band among the plurality of frequency bands; and based on identifying that the battery of the electronic device is charged below the designated level, transmit the data to the external device though the AP, using the second frequency band among the plurality of frequency bands.

14. The electronic device of claim 10, wherein the at least one processor is further configured to:

identifying, by the processor, whether context information corresponds to a designated condition;

based on identifying that the context information corresponds to the designated condition, transmit the data using an indirect path from the AP through another external device to the external device among a plurality of communication paths from the AP to the external device; and based on identifying that the context information does not correspond to the designated condition, transmit the data using a direct path from the AP to the external device among the plurality of communication paths.

15. The electronic device of claim 14, wherein the at least one processor is further configured to, based on identifying that the context information corresponds to the designated condition, store the data in the another external device.

16. The electronic device of claim 14, wherein the context information includes at least one of a status of the electronic device, an attribute of the data, a status of an access point connected with the electronic device, and a user input.

17. The electronic device of claim 16, wherein the status of the electronic device includes at least one of a battery level of the electronic device, a location, and a signal level.

18. The electronic device of claim 14, wherein the at least one processor is configured to identify whether a transmission rate between the electronic device and the AP is greater than a transmission rate between the AP and the external device by a designated threshold.

* * * * *